(12) United States Patent
Tenghamn et al.

(10) Patent No.: US 11,119,230 B2
(45) Date of Patent: Sep. 14, 2021

(54) GEOPHYSICAL SURVEY TECHNIQUES USING SELECTIVE-LENGTH PROCESSING

(71) Applicant: PGS Geophysical AS, Oslo (NO)

(72) Inventors: Stig Rune Lennart Tenghamn, Hollywood, FL (US); Manuel Beitz, Oslo (NO); Christian Strand, London (GB)

(73) Assignee: PGS GEOPHYSICAL AS, Oslo (NO)

( * ) Notice: Subject to any disclaimer, the term of this patent is extended or adjusted under 35 U.S.C. 154(b) by 432 days.

(21) Appl. No.: 16/055,856

(22) Filed: Aug. 6, 2018

(65) Prior Publication Data

US 2019/0056521 A1 Feb. 21, 2019

Related U.S. Application Data

(60) Provisional application No. 62/546,257, filed on Aug. 16, 2017, provisional application No. 62/546,181, filed on Aug. 16, 2017.

(51) Int. Cl.
| | |
|---|---|
| *G01V 1/38* | (2006.01) |
| *G01V 1/00* | (2006.01) |
| *G01V 1/37* | (2006.01) |
| *G01V 1/36* | (2006.01) |
| *G01V 1/30* | (2006.01) |

(52) U.S. Cl.
CPC .............. *G01V 1/005* (2013.01); *G01V 1/366* (2013.01); *G01V 1/375* (2013.01); *G01V 1/307* (2013.01); *G01V 1/37* (2013.01); *G01V 1/38* (2013.01); *G01V 1/3808* (2013.01); *G01V 1/3843* (2013.01); *G01V 1/3861* (2013.01); *G01V 2210/127* (2013.01); *G01V 2210/1293* (2013.01); *G01V 2210/1423* (2013.01)

(58) Field of Classification Search
CPC ........ G01V 1/005; G01V 1/375; G01V 1/366; G01V 1/3808; G01V 1/38
USPC ...................................... 367/39, 42
See application file for complete search history.

(56) References Cited

U.S. PATENT DOCUMENTS

| | | | |
|---|---|---|---|
| 4,607,353 A | 8/1986 | Muir | |
| 4,809,235 A | 2/1989 | Dragoset, Jr. | |
| 4,969,129 A | 11/1990 | Currie | |
| 5,991,235 A * | 11/1999 | Allen | G01V 1/005 181/113 |
| 6,664,788 B2 | 12/2003 | Hornbostel et al. | |

(Continued)

OTHER PUBLICATIONS

Geophysical Technology Back on solid ground, Geophysical Technology, posted Jun. 21, 2017, http://geophysicaltechnology.com/back-solid-ground/, 3 pages.

(Continued)

*Primary Examiner* — Ian J Lobo

(57) ABSTRACT

Techniques are disclosed relating to geophysical surveying. In various embodiments, a marine survey vessel may tow a plurality of streamers that each include a plurality of seismic sensors. Further, the survey vessel may tow a plurality of vibratory sources. In various embodiments, a first sweep may be performed, using one or more of the plurality of vibratory sources, for a first time interval. Further, in various embodiments, disclosed techniques may include recording, during the first time interval using the plurality of seismic sensors, seismic data on a tangible, computer-readable medium, thereby creating a geophysical data product.

22 Claims, 16 Drawing Sheets

(56) References Cited

U.S. PATENT DOCUMENTS

| | | | |
|---|---|---|---|
| 7,515,505 | B2 | 4/2009 | Krohn et al. |
| 8,094,514 | B2 | 1/2012 | Tenghamn |
| 8,335,127 | B2 | 12/2012 | Tenghamn |
| 8,923,092 | B2 | 12/2014 | Vu et al. |
| 9,678,235 | B2 | 6/2017 | Widmaier et al. |
| 9,709,689 | B2 | 7/2017 | Harrick |
| 9,804,283 | B2 | 10/2017 | Guillouet et al. |
| 9,885,587 | B2 | 2/2018 | Oscarsson et al. |
| 10,215,872 | B2 | 2/2019 | Abma |
| 10,444,391 | B2 | 10/2019 | Ellmauthaler et al. |
| 2008/0232194 | A1 | 9/2008 | Jeffryes |
| 2013/0343153 | A1 | 12/2013 | Laws |
| 2014/0043937 | A1 | 2/2014 | Teyssandier et al. |
| 2017/0371055 | A1* | 12/2017 | Poole ............... G01V 1/368 |
| 2018/0128927 | A1 | 5/2018 | Tenghamn |

OTHER PUBLICATIONS

R. Tenghamn, et al., "Spread Spectrum Sweep Strategy to Improve Operational Efficiency with Marine Vibrators," 80th EAGE Conference & Exhibition, Jun. 11-14, 2018, Copenhagen, Denmark, 5 pages.
International Search Report and Written Opinion in PCT Appl. No. dated Jan. 1, 2019, 18 pages.
Hoover et al., "Vibrator signals," Proceedings of the IEEE, vol. 72 No. 10, Oct. 1, 1984, pp. 1290-1306.

\* cited by examiner

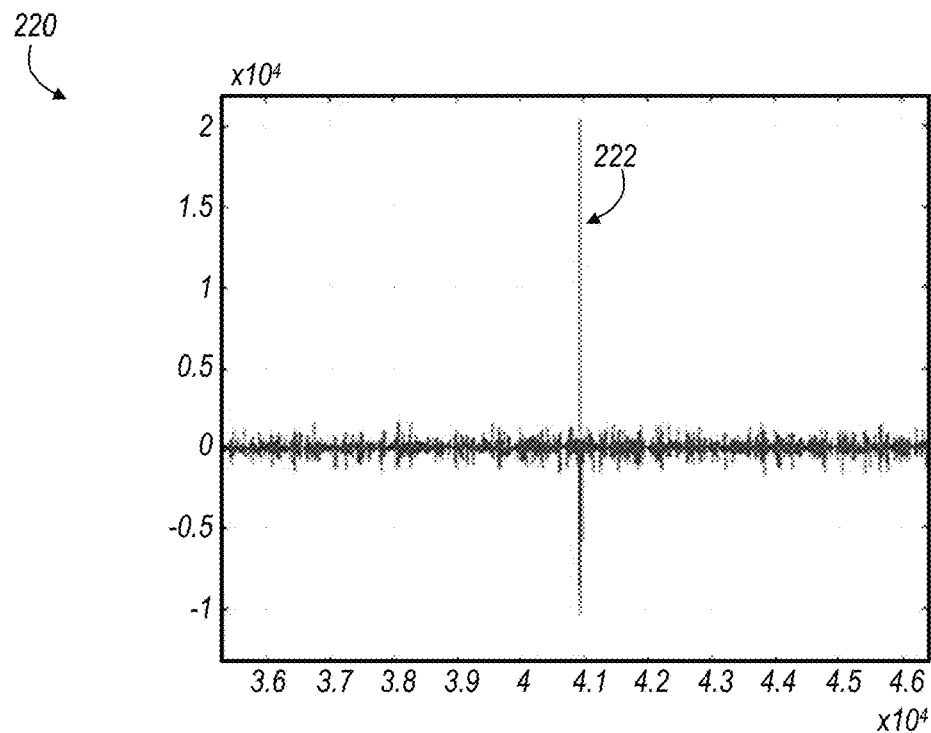
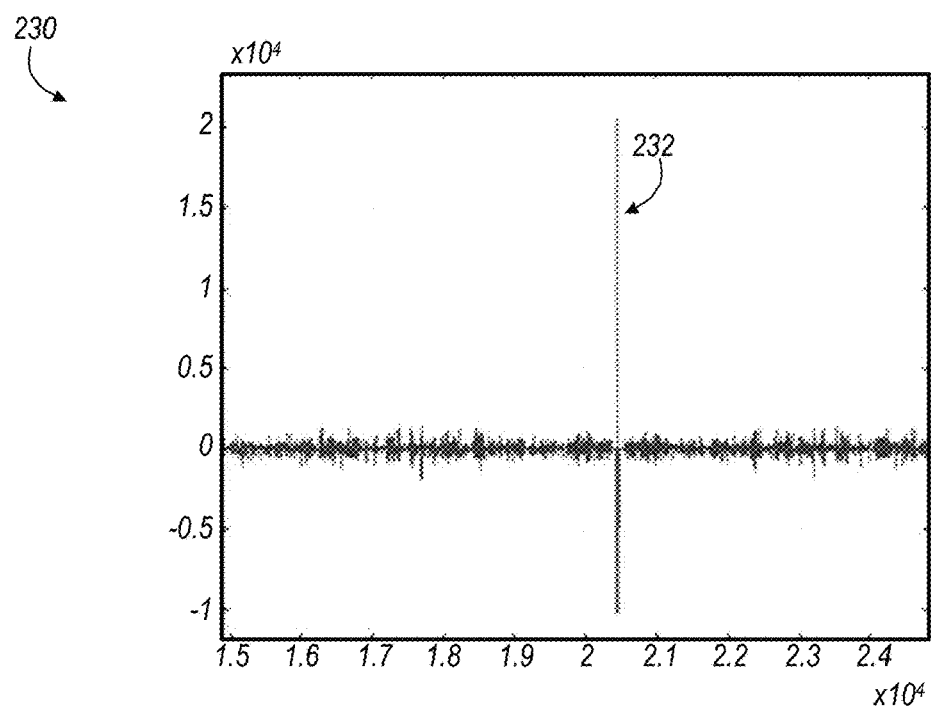
FIG. 2C

900

Access, by a computer system, seismic data for a geological formation, where the seismic data is recorded, using one or more sensors, during a seismic survey in which one or more of a plurality of vibratory sources were used to perform a first sweep during a first time interval
902

↓

Image, by the computer system, a first location of the geological formation using a correlation of only a portion of the first sweep with the seismic data
904

↓

Image, by the computer system, a second location of the geological formation using a correlation of an entirety of the first sweep with the seismic data
906

1002
Access, by a computer system, seismic data for a geological formation, where the seismic data is recorded during a seismic survey in which a first vibratory source was driven using a first digital code for at least a first time interval, where the first digital code includes a first plurality of sub-sections corresponding to portions of the first time interval

1004
Image, by the computer system, a first location of the geological formation using a correlation of only a first sub-section of the first plurality of sub-sections with the seismic data

1006
Image, by the computer system, a second location of the geological formation using a correlation of two or more of the first plurality of sub-sections with the seismic data

FIG. 10

GEOPHYSICAL SURVEY TECHNIQUES USING SELECTIVE-LENGTH PROCESSING

This application claims the benefit of U.S. Provisional Application No. 62/546,257, filed on Aug. 16, 2017 and U.S. Provisional Application No. 62/546,181, filed on Aug. 16, 2017, both of which are hereby incorporated by reference as if entirely set forth herein.

BACKGROUND

Geophysical surveys are often used for oil and gas exploration in geological formations, which may be located below marine environments. Seismic geophysical surveys, for example, are based on the use of acoustic waves. In seismic surveys, a survey vessel may tow one or more signal sources (e.g., an air gun or a marine vibrator) and a plurality of streamers along which a number of acoustic sensors (e.g., hydrophones and/or geophones) are located. Acoustic waves generated by the source may then be transmitted through the earth's crust and then reflected back and captured at the geophysical sensors. Data collected during a marine geophysical survey may be analyzed to locate hydrocarbon-bearing geological formations, and thus determine where deposits of oil and natural gas may be located.

A typical goal in geophysical marine surveys is to obtain geophysical data corresponding to various portions of the geological formations. For example, it may be desirable to obtain geophysical data corresponding to shallow, intermediate, and deep portions of a geological formation. Geological formations may, however, have an attenuating effect on the acoustic waves generated by the signal sources used in a geophysical survey. Thus, some geophysical surveys may use signal sources to generate high-energy acoustic waves in an effort to image deep portions of the geological formation. Such an approach, however, may require a greater number of signal sources, increasing the cost of the geophysical survey, as well as having a potentially negative environmental impact. It is desirable, therefore, to obtain geophysical data corresponding to various portions of a geological formation while reducing the cost and environmental impact associated with the geophysical survey.

BRIEF DESCRIPTION OF THE DRAWINGS

FIGS. 2B-2C are example plots of auto-correlated data, according to some embodiments.

FIGS. 9-10 are flow diagrams illustrating example methods for generating seismic imaging data, according to some embodiments.

Figure 1:
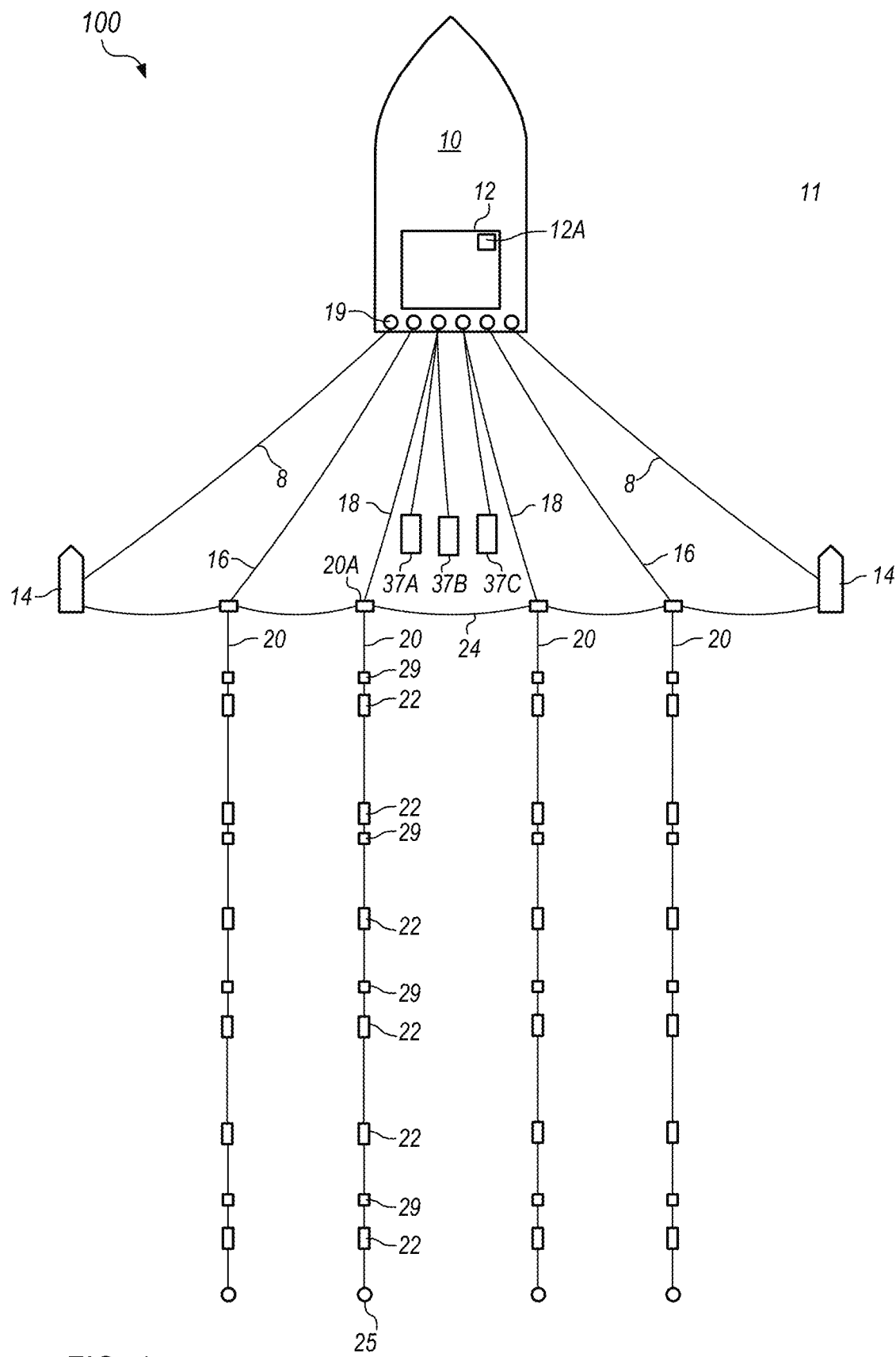
FIG. 1 is a block diagram illustrating an example geophysical survey system, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured to" perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Control equipment configured to drive a vibratory signal source" is intended to cover, for example, equipment that has circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The terms "including" and "comprising," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" or "responsive to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in the phrase "imaging multiple locations of a geological formation using a correlation of a first portion of a first sweep with seismic data," the term "first portion" can be used to refer to any portion of the first sweep, and not, for example, simply the temporally-first portion of the sweep.

When used in the claims, the term "or" is used as an inclusive or and not as an exclusive or. For example, the phrase "at least one of x, y, or z" means any one of x, y, and z, as well as any combination thereof (e.g., x and y, but not z).

DETAILED DESCRIPTION

Example Survey System

In FIG. 1, a block diagram illustrating an example embodiment of a geophysical survey system 100 is shown. In various embodiments, survey system 100 may be configured to acquire geophysical data corresponding to geological structures disposed below body of water 11. In the illustrated embodiment, system 100 includes survey vessel 10, signal sources 37, paravanes 14, and streamers 20.

In various embodiments, survey vessel 10 may be configured to move along the surface of body of water 11, such as a lake or the ocean. In geophysical survey system 100, survey vessel 10 tows streamers 20, signal sources 37, and paravanes 14. In other embodiments, at least a portion of streamers 20 may be towed by a second survey vessel (not shown), in place of or in addition to survey vessel 10. Similarly, in some embodiments, at least a portion of signal sources 37 may be towed by one or more additional survey vessels (not shown), in place of or in addition to survey vessel 10.

Survey vessel 10 may include equipment, shown generally at 12 and, for convenience, collectively referred to as "control equipment." Control equipment 12 may include devices such as a data recording unit (not shown separately) for making a record with respect to time of signals generated by various geophysical sensors in the system 100. Note that, in various embodiments, control equipment 12 may be configured to record reflected seismic signals in a continuous manner, in a non-continuous manner (e.g., by recording a series of segments in the field rather than continuously), or in a combination of the two. Control equipment 12 may also include navigation equipment (not shown separately), which may be configured to control, determine, and record, at selected times, the geodetic positions of: survey vessel 10, each of a plurality of geophysical sensors 22 disposed at locations on streamers 20, and/or signal sources 37. Geodetic position may be determined using various devices, including global navigation satellite systems such as the global positioning system (GPS), for example. In the illustrated embodiment, survey vessel 10 includes geodetic positioning device 12A. Additional positioning devices may be placed at various locations on streamers 20 in some embodiments. In some embodiments, control equipment 12 is configured to control sources 37, e.g., to control when the sources 37 activate, where the sources 37 are positioned, the manner in which the sources 37 are driven, etc.

In geophysical survey system 100, survey vessel 10 is shown towing three signal sources 37A-37C (referred to collectively as "sources 37" or "signal sources 37"). In various embodiments, however, survey vessel 10 may tow any appropriate number of signal sources, including as few as none (e.g., when sources are towed by another vessel) or as many as six or more. The location of the signal sources 37 may be centered behind survey vessel 10 or displaced from the center line, and may be at various distances relative to survey vessel 10, including attached to the hull.

In various embodiments, one or more of signal sources 37 may be vibratory signal sources configured to be driven according to a given function or digital code. Further, in some embodiments, survey system 100 may include both low-frequency vibratory signal sources, configured to generate seismic signals in a lower frequency range (e.g., 5-30 Hz) and high-frequency vibratory signal sources, configured to generate seismic signals in a higher frequency range (e.g., 25-100 Hz). Note, however, that this embodiment is provided merely as an example. In various embodiments, any suitable number of types of signal source 37 may be used, each utilizing any suitable frequency range. In some embodiments, for example, signal sources 37 may include low-frequency signal sources configured to generate seismic signals in a lower frequency range (e.g., 5-25 Hz), mid-frequency signal sources configured to generate seismic signals in a mid-frequency range (e.g., 25-60 Hz), and high-frequency signal sources configured to generate seismic signals in a higher frequency range (e.g., 60-100 Hz). In various embodiments, each signal source 37 may include an array (e.g., a string) of multiple signal sources. In other embodiments, all of the sources in a given survey may operate within the same frequency spectrum.

As discussed in more detail below, one or more of signal sources 37 may be used to perform a sweep during a geophysical survey. As used herein, the term "sweep" is used according to its ordinary meaning in the art, including to refer to the driving of a signal source 37 to generate a seismic signal. In various embodiments, the seismic signal generated by a signal source 37 when performing a sweep may include a group of frequencies, e.g., a group of frequencies within a given frequency band. Note, however, that the term sweep as used herein does not necessarily imply an ordering in which the frequency components of a seismic signal are generated in a given sweep. For example, this term does not imply that the frequency of the signal changes linearly over time. As explained in more detail below with reference to FIGS. 3 and 4, performing a sweep may include driving one or more signal sources 37, such as one or more vibratory sources, based on a digital code (e.g., one or more Gold codes, etc.) or function (e.g., a linearly- or non-linearly-changing function, etc.). Stated differently, the term "sweep," as used herein, may include linear sweeps, non-linear sweeps, random sweeps, and sweeps that are performed by driving a vibratory source based on a digital code.

Geophysical sensors 22 on streamers 20 may be any of various types of geophysical sensor. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors, or any suitable combination of the foregoing. In various implementations of the disclosure, geophysical sensors 22 may measure, for example, seismic field energy indicative of the response of various structures in the Earth's subsurface formation below the bottom of body of water 11 to energy imparted into the subsurface formation by one or more of signal sources 37. Seismic energy, for example, may originate from signal sources 37 deployed in body of water 11 and towed by survey vessel 10. In some embodiments, streamers 20 include tail buoys 25.

In some embodiments, streamers 20 may include steering devices such as birds 29 configured to maintain streamers 20 in a desired position (e.g., at a specified depth and/or lateral displacement). Similarly, steering devices may be used to facilitate positioning of sources 37. In some embodiments, survey vessel 10 may be configured to tow streamers 20 using various geometries such as different feather angles, depth profiles etc. In some embodiments, streamers 20 may include multiple geodetic positioning devices (not shown).

In the geophysical survey system 100 shown in FIG. 1, survey vessel 10 tows four streamers 20. In various embodiments, however, survey vessel 10 may tow any appropriate number of streamers, including as few as none (e.g., when streamers are towed by another vessel) or as many as 26 or more. In various embodiments, streamers 20 may include any of various appropriate modules in addition to geophysical sensors 22. In geophysical survey systems, such as shown in FIG. 1, that include a plurality of laterally spaced-apart streamers, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths and/or different lateral displacements from a centerline of survey vessel 10.

Control equipment 12, in one embodiment, includes a computing system (an exemplary embodiment of which is discussed below with reference to FIG. 12) configured to, inter alia, process sensor outputs from geophysical sensors 22. In other embodiments, a computing system at another location may process geophysical data gathered by geophysical survey system 100 (e.g., on land after a survey has been conducted). A computing system may include or be configured to access a non-transitory storage medium having instructions stored thereon that are executable to perform various operations described herein in order to conduct a survey or process sensor outputs generated during a survey. A computing system may include one or more processors configured to execute the program instructions to cause a system to perform various functionality described herein. Additionally, in various embodiments, control equipment 12 may include a non-transitory, computer-readable medium, which may be used to manufacture a geophysical data product. In some embodiments, various items of information relating to geophysical surveying (e.g., raw data collected by sensors or products derived therefrom by the use of post-collection processing) may be embodied in a "geophysical data product." A geophysical data product may comprise a computer-readable, non-transitory medium having geophysical data stored on the medium, including, e.g., raw streamer data, processed streamer data, two- or three-dimensional images based on streamer data, or other suitable representations. Some non-limiting examples of computer-readable media include tape reels, hard drives, CDs, DVDs, flash memory, optical media, holographic media, etc., although any tangible computer-readable medium may be employed to create the geophysical data product. In some embodiments, raw analog data from streamers may be stored in the geophysical data product. In other instances, the data may first be digitized and/or conditioned prior to being stored in the geophysical data product. In yet other instances, the data may be fully processed into a two- or three-dimensional image of various geological formations, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured subsequent to survey completion, e.g., during the course of analysis of the survey.

In various embodiments, it may be desirable to obtain geophysical data corresponding to various (e.g., shallow, intermediate, deep, etc.) portions of a geological formation disposed beneath body of water 11. Obtaining such data, however, may present various challenges depending on the depth for which geophysical data is being acquired. For example, as noted above, geological formations may have an attenuating effect on the acoustic signals generated by signal sources 37, particularly in the higher frequencies. In an effort to correct for this attenuating effect, some survey systems are designed to use signal sources to produce excessively-high energy, sufficient to effectively image deep portions of a geological formation. Such an approach, however, may have undesirable consequences. For example, such surveys may inefficiently utilize the energy produced by the signal sources, requiring a greater number of signal sources and thus increasing the survey cost. Further, using excessive seismic energy during a geophysical survey may have an undesirable environmental impact.

Note that, in various embodiments of system 100, the duration of a sweep performed by one or more signal sources 37 may correspond to the spatial sampling density of the resulting data during geophysical imaging. For example, while performing a sweep, signal sources 37 are towed through body of water 11. Accordingly, in various embodiments, relatively longer sweep lengths may result in seismic signals received at streamers 20 with greater distances between actuations of signal sources 37, which in turn may correspond to lower spatial resolution (e.g., greater bin size). Conversely, in various embodiments, relatively shorter sweep lengths may result in seismic signals received at streamers 20 with peaks (e.g., as a result of autocorrelation of the received seismic signals) that correspond to smaller distances between actuations of signal sources 37, which in turn may correspond to higher spatial resolution (e.g., smaller bin size).

Further, in various embodiments of system 100, the duration of a sweep performed by one or more of signal sources 37 may correspond to the amount of energy that may be recovered from the resulting data during geophysical imaging. That is, the longer the sweep length, the more energy that typically may be recovered from the received seismic signals, in some embodiments. For example, the reflected seismic signals received by streamers 20 based on a relatively long sweep (e.g., 40 seconds) may be used to generate data (e.g., through autocorrelation) with a higher signal-to-noise ratio than data generated from a shorter sweep. As discussed above, however, because the sweeps are performed as the survey vessel 10 and signal sources 37 move along body of water 11, the seismic signals received by streamers 20 based on a relatively long sweep may include larger distances between actuations of signal source 37. Thus, in various embodiments, relatively long sweeps may be used to obtain data with a high signal-to-noise ratio, but at the expense of spatial sampling density. Further, the reflected seismic signals received by streamers 20 based on a relatively short sweep (e.g., 10 seconds) may be used to generate data (e.g., through autocorrelation) with a lower signal-to-noise ratio, but a higher spatial resolution. As will be appreciated by one of skill in the art with the benefit of this disclosure, data corresponding to a sweep or portion of a sweep may be used to generate imaging data corresponding to a geological formation. In some embodiments, generating imaging data may include performing autocorrelation, among other operations. Autocorrelation is a well-understood process for measuring the correlation of a signal with a time-delayed version of itself, as a function of the delay. In the survey context, autocorrelation may be performed to determine the delay between the transmission of the signal used to modulate one or more sources and the reflected signal received by one or more sensors.

In obtaining geophysical data corresponding to relatively shallow portions of a geophysical feature, the attenuation of seismic signals due to the geophysical structures being imaged may have a less detrimental effect on the data received by streamers 20. Accordingly, it may be inefficient and unnecessary to image relatively shallow geophysical structures using higher-energy seismic signals. Instead, in imaging relatively shallow portions of a geological formation, it may be more desirable to obtain data with high spatial resolution, with less concern placed on the signal-to-noise ratio of the recovered data. In various embodiments, data with high spatial resolution may be acquired by using signal sources 37 to perform short sweeps (e.g., 5-10 seconds) with short shot-point intervals. The resulting reflected signals received by streamers 20 may be used (e.g., through autocorrelation) to generate geophysical data, corresponding to relatively shallow portions of the geological formation, with high spatial resolution.

In obtaining geophysical data corresponding to relatively deep portions of a geophysical feature, however, the attenuation of seismic signals due to the geology being imaged may be more pronounced, particularly at the higher frequencies of the seismic signals. Accordingly, in imaging relatively deep portions of a geological formation, it may be desirable to obtain data with a high signal-to-noise ratio, e.g., to obtain accurate data corresponding to deep geophysical features. In various embodiments, data with a high signal-to-noise ratio may be acquired using signal sources 37 to perform longer sweeps (e.g., 30-40 seconds) with longer shot-point intervals. The resulting reflected signals received by streamers 20 may be used (e.g., through autocorrelation) to generate geophysical data, corresponding to deeper portions of the geological formation, with a relatively high signal-to-noise ratio.

Using different sweep lengths and/or signal power may complicate surveys, use substantial power, require a substantial number of signal sources, etc. To address these or other technical problems, various embodiments include driving one or more signal sources 37 continuously through multiple sweeps to allow use of different time interval portions of the sweeps to image different locations in a geographic formation. Note that, in various embodiments, "continuous" operation of a signal source 37, such as by driving the signal source 37 according to a function (e.g., a linear function) or a digital code (e.g., a Gold code) to continuously perform multiple sweeps, may mean that a subsequent sweep begins at the completion of the current sweep. That is, continuous operation of a signal source 37 may include beginning a sweep or sub-sweep immediately or after a relatively short delay following the preceding sweep for that signal source 37 such that the source 37 is being operated for, e.g., 80%, 90%, 95%, or more of the relevant time interval.

In various embodiments, control equipment 12 may be configured to continuously drive one or more signal sources 37 to perform sweeps with various portions during a given time interval. That is, control equipment 12 may be configured to begin a sweep or sub-sweep, using one or more signal sources 37, as soon as the previous sweep or sub-sweep ends, according to some embodiments. Further, control equipment 12 may be configured to record, via various sensors 22, reflected seismic signals received by the various sensors 22 during the given time interval. Thus, various embodiments of the disclosed systems are configured to continuously perform sweeps and continuously record the resulting data during a given time period. The disclosed control equipment 12 and signal sources 37, and their corresponding structural equivalents, may be referred to as means for continuously performing one or more sweeps during a given time interval.

The disclosed systems and methods may provide various improvements to the acquisition of geophysical data corresponding to various portions of geological formations. For example, in various embodiments, the reflected seismic signals received by streamers 20, based on one or more signal sources 37 continuously performing one or more sweeps, may be useful in imaging various portions of geological formations disposed below body of water 11. That is, in some embodiments, the disclosed systems and methods allow for data corresponding to various portions of one or more sweeps to be selectively combined or separated when generating imaging data. For example, in imaging a deep portion of a geophysical structure, data corresponding to a long portion (e.g., 40 seconds) of a sweep may be selected and used to generate imaging data with a relatively high signal-to-noise ratio. In imaging intermediate-depth portion of the geophysical structure, data corresponding to a shorter portion of a sweep (e.g., 20-30 seconds) may be selected and used to generate imaging data with both a sufficiently high spatial resolution and signal-to-noise ratio. Further, in imaging a shallow portion of geophysical structure, data corresponding to a short sweep (e.g., 10 seconds) or a portion of a sweep (e.g., 5 seconds) may be selected and used to generate imaging data with a lower signal-to-noise ratio, but with higher spatial resolution.

Note that, although three sweep lengths corresponding to three relative depths of a geological formation have been described, this embodiment is provided merely as an example and is not intended to limit the scope of this disclosure. Rather, one of ordinary skill in the art with the benefit of this disclosure will recognize that data corresponding to longer or shorter sweep lengths may be chosen depending, for example, on the depth of the portion of the geological formation being imaged, survey conditions, etc.

Further, in various embodiments, the disclosed systems and methods for continuously performing sweeps, and continuously recording the resulting data, may allow for more efficient utilization of the energy produced by signal sources 37. For example, conventional survey systems may use a large array of signal sources that produce high-energy seismic signals. While such high-energy signals may be used to image deeper portions of a geophysical structure, they may be unnecessarily high for imaging more shallow portions of the geophysical structure. The disclosed systems and methods, however, may effectively increase the effective strength of the received seismic signals without increasing the number or output of signal sources 37, reducing the number of signal sources 37 used during a seismic survey. This, in turn, may reduce the cost and environmental impact associated with performing a seismic survey.

Figure 2A:
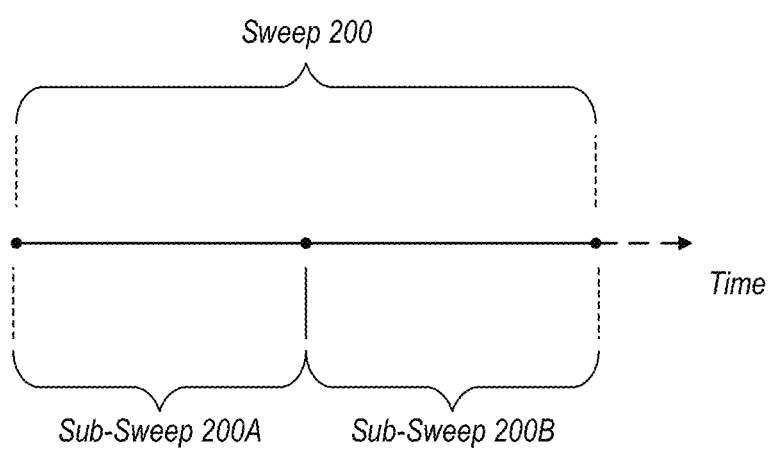
FIG. 2A is a diagram illustrating an example sweep, according to some embodiments.

Turning now to FIG. 2A, a timing diagram corresponding to an example sweep 200 is shown, according to some embodiments. As shown in FIG. 2A, sweep 200 includes sub-sweeps 200A and 200B. In various embodiments, sweep 200 may correspond to a sweep performed using one or more signal sources 37 of FIG. 1. That is, in some embodiments, one or more signals sources 37 may perform sweep 200 by performing sub-sweep 200A followed by sub-sweep 200B. For example, in some embodiments, one or more signal sources 37 may begin performing sub-sweep 200B immediately or almost immediately after the end of sub-sweep 200A. In other embodiments, one or more sources 37 may begin performing sub-sweep 200B after a predetermined delay period following the end of sub-sweep 200A.

As noted above, one or more of signal sources 37 may be vibratory signal sources, according to various embodiments. A vibratory signal source 37 may be operated, for example, using hydraulic or electrical power to drive an actuating plate in a controlled, oscillatory manner according to a given function or modulated using one or more digital codes. In such embodiments, a vibratory signal source 37 may be used to project a precise signal into the subsurface. For example, as discussed in more detail below with reference to FIG. 3, one or more vibratory signal sources 37 may be used to perform linear sweeps or random sweeps, according to various embodiments. In one embodiment, for example, a vibratory signal source 37 may perform a linear sweep 200 from a first frequency (e.g., 5 Hz) to a second frequency (e.g., 80 Hz) over the course of a first time interval (e.g., 20 seconds). In such an embodiment, sub-sweep 200A may correspond to a first portion of sweep 200 (e.g., the frequency range 5-30 Hz) and sub-sweep 200B may correspond to a second portion of sweep 200 (e.g., the frequency range 30-80 Hz).

Further, as discussed below in reference to FIGS. 4A and 4B, one or more vibratory signal sources 37 may be used perform sweeps based on one or more digital codes, such as Gold codes, m-sequences, etc., according to some embodiments. For example, in one embodiment, survey system 100 may perform a sweep 200 for a first time interval (e.g., 20 seconds), where the first sweep includes sub-sweeps 200A-200B corresponding to portions of the first time interval. In such an embodiment, performing sweep 200 may include performing sub-sweep 200A for a first portion of the first time interval (e.g., 10 seconds) by activating a vibratory signal source 37 based on a first digital code. Further, in such an embodiment, performing sweep 200 may include subsequently performing sub-sweep 200B for a second portion of the first time interval (e.g., 10 seconds) by activating the vibratory signal source 37 based on a second digital code. Note that, in some embodiments, the first digital code and the second digital code may be uncorrelated to at least a threshold degree. For example, in some embodiments the first digital code may be a first Gold code, and the second digital code may be a second Gold code. In other embodiments, the same Gold code may be used for both sub-sweeps, but may be uncorrelated with other Gold codes used to continuously drive other sources. In various embodiments, the seismic data recorded during such a seismic survey may include data based on both of sub-sweeps 200A and 200B.

Note that, although only two sub-sweeps 200A-200B are shown in FIG. 2A, this embodiment is provided merely as an example and is not intended to limit the scope of this disclosure. In other embodiments, any suitable number of sub-sweeps may be included in a given sweep, as described with reference to FIG. 5.

In various embodiments, performing sweep 200 (e.g., using one or more signal sources 37) causes corresponding seismic signals to be transmitted into the seabed under body of water 11, reflected off of various portions of one or more geophysical structures, and received at one or more sensors 22. As noted above, the received data may be selectively used to image various portions of the geophysical structure. For example, in imaging a relatively shallow portion of the geophysical structure, data corresponding to sub-sweep 200A or 200B (or a portion of sub-sweep 200A or 200B) may be selected and used to generate (e.g., through autocorrelation) imaging data with high spatial resolution, as discussed in more detail with reference to FIG. 2B. Further, in imaging a deeper portion of the geophysical structure, data corresponding to a larger number of sub-sweeps or the entire sweep 200 may be selected and used to generate (e.g., through autocorrelation) imaging data with a high signal-to-noise ratio, as discussed in more detail with reference to FIG. 2C. Thus, performing sweep 200 as described herein may facilitate selectively imaging deep and shallow portions of geological formations, according to various embodiments.

Figure 2B:
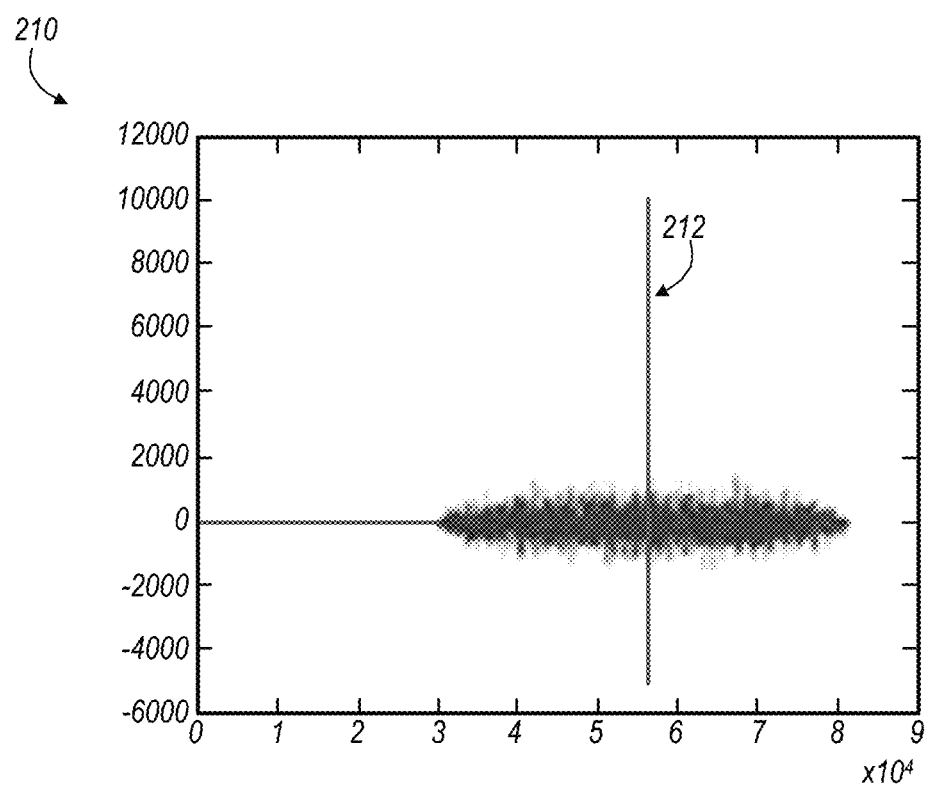

Referring now to FIGS. 2B and 2C, example plots 210-230 of auto-correlated data are shown, according to some embodiments. In various embodiments, plots 210-230 may be generated based on signals received by streamers 20 while performing sweep 200 using one or more vibratory sources 37. More specifically, FIG. 2B depicts an example plot 210 of auto-correlated data that may correspond to signals received at one or more sensors 22 based on sub-sweep 200A or 200B of FIG. 2A, according to some embodiments. Further, FIG. 2C depicts example plots 220 and 230 of auto-correlated data. As noted above, autocorrelation is a well-understood process for measuring a degree of similarity between a signal and a delayed version of the signal as a function of the delay. In FIGS. 2B-2C, the x-axes of plots 210-230 are provided in units of delay, while the y-axes of plots 210-230 have the units of the signal squared. Note that in other embodiments, however, the autocorrelation data may be normalized and may be presented on the y-axes of plots 210-230 accordingly.

In the depicted embodiment, example plot 220 corresponds to signals received at one or more sensors 22 based on an entirety of sweep 200 (that is, the sum of sub-sweeps 200A and 200B), while example plot 230 corresponds to signals received at one or more sensors 22 based on a sweep of the same duration as sweep 200 (not separately shown). For example, in one embodiment, sub-sweeps 200A and 200B may be performed by driving a vibratory signal source 37 according to a first and second Gold code, and example plot 220 may correspond to signals received at one or more sensors 22 based on both sub-sweeps 200A and 200B. Further, in such an embodiment, another sweep may be performed by driving a vibratory signal source 37 according to a single Gold code that is of the same length as the first and second Gold code combined, and example plot 230 may correspond to signals received at one or more sensors 220 based on that sweep.

Referring to FIG. 2B, plot 210 may correspond to data received at one or more sensors 22 based on sub-sweep 200A performed by a signal source 37, in some embodiments. In such embodiments, plot 210 may be generated using a correlation (e.g., an autocorrelation) of the function (e.g., linear function, digital code, etc.) used to drive the signal source 37 while performing sub-sweep 200A with the seismic data received at the one or more sensors 22. As will be appreciated by one of ordinary skill in the art with the benefit of this disclosure, auto-correlated data, such as that depicted in plots 210-230, may be useful in determining imaging information associated with geological structures disposed beneath body of water 11. For example, as shown in FIG. 2B, plot 210 includes correlation peak 212, which may be indicative of a distance traveled by reflected seismic signals received by one or more sensors 22. As noted above, data corresponding to sub-sweep 200A may be selectively used to generate imaging data with high spatial resolution corresponding to a relatively shallow portion of a geophysical structure.

By comparison, consider plot 220 of FIG. 2C, which corresponds to data received at one or more sensors 22 based on an entirety of sweep 200 performed by a signal source 37, according to some embodiments. In such embodiments, plot 220 may be generated using a correlation (e.g., an autocorrelation) of the function(s) (e.g., linear functions, digital codes, etc.) used to drive the signal source 37 while performing sweep 200 with the seismic data received at the one or more sensors 22. As noted above, sweep 200 may correspond to the sum of sub-sweeps 200A and 200B. Thus, stated differently, plot 220 may be generated using a correlation of the function(s) used to drive signal source 37 while performing sub-sweep 200A and 200B with the seismic data received at the one or more sensors 22.

Data corresponding to the entire sweep 200 may be selectively used to generate imaging data with a high signal-to-noise ratio corresponding to a relatively deep portion of a geophysical structure. For example, in the depicted embodiment, the signal-to-noise ratio of plot 220 (depicting the auto-correlated data corresponding to sweep 200) is approximately 20:1. The signal-to-noise ratio of plot 210 (depicted the auto-correlated data corresponding to sub-sweep 200A), for comparison, is approximately 10:1. Thus, in the depicted embodiment, the signal-to-noise ratio of plot 220 is approximately twice that of the signal-to-noise ratio of plot 210.

Note that the depicted embodiment is shown merely as an example and is not intended to limit the scope of this disclosure. The signal-to-noise ratio of correlated data may vary based on various factors, including, for example, the length of the sweep used to generate the seismic signals, the energy used by the signal source 37 in generating the seismic signals, the functions or digital codes used to drive the signal source 37, etc. Thus, in various embodiments, imaging data generated based on a sub-sweep 200A or 200B (or a portion of sub-sweep 200A or 200B) may have a first spatial resolution and a first signal-to-noise ratio, while imaging data based on an entirety of sweep 200 may have a second spatial resolution that is lower than the first spatial resolution and a second signal-to-noise ratio that is greater than the first signal-to-noise ratio.

Further, consider plot 230 of FIG. 2C. As noted above, plot 230 corresponds to data received at one or more sensors 22 based on a sweep that is of the same duration as sweep 200. For example, in the depicted embodiment, sweep 200 may be twenty seconds long, including a 10-second sub-sweep 200A and a 10-second sub-sweep 200B. In such an embodiment, the sweep used to generate data for plot 230 may also be twenty seconds in duration, but, unlike sweep 200, may not include distinct sub-sweeps 200A or 200B. Note that the signal-to-noise ratios for plots 220 and 230 are fairly similar, despite the data for plot 220 coming from the sum of sub-sweeps 200A and 200B (that is, from sweep 200).

Therefore, in various embodiments, by performing longer sweeps (such as sweep 200) with multiple sub-sweeps (such as sub-sweeps 200A and 200B) during a seismic survey, the disclosed systems and methods allow for selectively imaging deeper portions of a geological formation (e.g., based on sweep 200) or more shallow portions of the geological formation (e.g., based on sub-sweep 200A or 200B).

Figure 3:
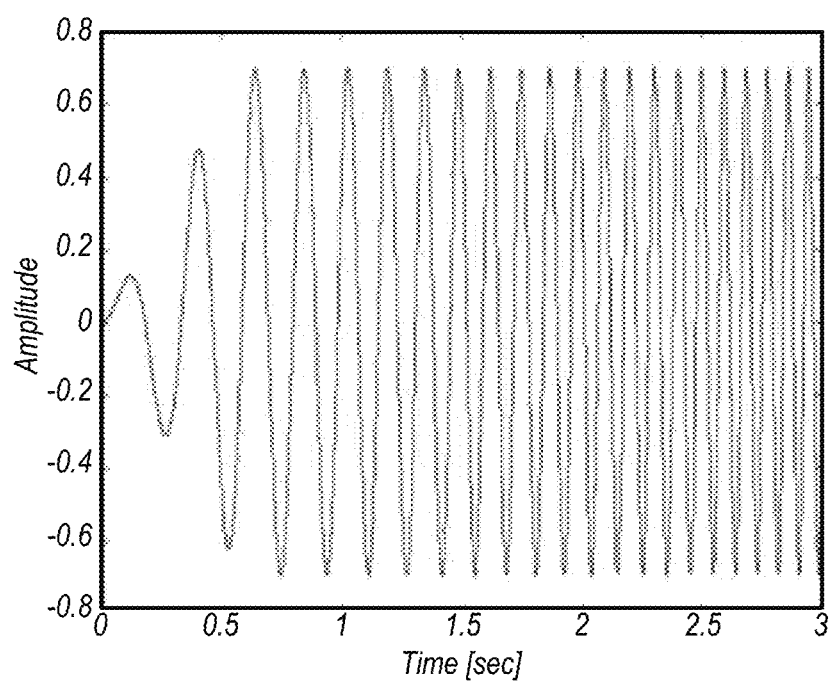
FIG. 3 is a graph of an example seismic signal, according to some embodiments.

Referring now to FIG. 3, graph 300 depicts an example signal that may be used to drive one or more signal sources 37 based on a particular function to perform one or more sweeps, according to some embodiments. For example, in some embodiments, the signal depicted in graph 300 may correspond to a signal generated by a signal source 37 while performing a portion of sweep 200 or sub-sweeps 200A or 200B of FIG. 2A.

For example, in some embodiments, one or more vibratory signal sources 37 may be used to perform a linear sweep, in which the generated signal linearly-increases from a first frequency (e.g., 10 Hz) to a second frequency (e.g., 80 Hz). Alternatively, in some embodiments, a linear sweep may be performed such that the generated signal linearly-decreases from a first frequency (e.g., 90 Hz) to a second frequency (e.g., 5 Hz). Further, in some embodiments, one or more vibratory signal sources 37 may be used to perform a "random sweep," in which the signal generated includes a pseudo-random distribution of frequency components within a given frequency range (e.g., 10-95 Hz).

Note that, in some embodiments, a given sweep (e.g., linear sweep, random sweep, etc.) may be performed using multiple signal sources 37. For example, in an embodiment in which a sweep changes between a first frequency (e.g., 5 Hz) and a second frequency (e.g., 90 Hz), a low-frequency signal source 37 may be used to perform a low-frequency portion (e.g., from 5-30 Hz) of the sweep and a high-frequency signal source 37 may be used to perform a high-frequency portion (e.g., 30-90 Hz) of the sweep. For instance, consider an example in which sweep 200 of FIG. 2A is a linearly-increasing sweep from 10 Hz to 90 Hz, with sub-sweep 200A corresponding to a linear sweep from 10 Hz to 30 Hz and sub-sweep 200B corresponding to a linear sweep from 30 Hz to 90 Hz. In such an embodiment, sub-sweep 200A may be performed by a low-frequency vibratory signal source 37 and sub-sweep 200B may be performed by a high-frequency vibratory signal source 37. As demonstrated by this example, note that the portions of a sweep devoted to a given frequency range may vary, according to various embodiments. For example, in some embodiments, an equal period of time may be spent on all parts of the frequency band included in a sweep. In other embodiments, however, a sweep may spend more or less time on any particular frequency components of a given frequency range.

In the embodiment depicted in FIG. 3, the signal shown in graph 300 increases from a first frequency to a second, higher frequency over a given time interval, namely from 0 seconds to 3 seconds. Note that graph 300 depicts only a portion of the signal that may be used to drive a vibratory signal source 37 during a sweep (such as sweep 200) or a sub-sweep (such as sub-sweep 200A or 200B). That is, in some embodiments, the signal may continue to increase over an entire, longer time interval (e.g., 40 seconds) as a signal source 37 performs a sweep. In other embodiments, however, a sweep may include, during a given time interval, multiple shorter sweeps (e.g., linear sweeps, random sweeps, etc.) from a first frequency to a second frequency. Stated differently, performing a sweep may include driving a signal source 37 using a signal that linearly increases (e.g., from 5 Hz to 90 Hz) for an entire duration of the sweep (e.g. 40 seconds). Alternatively, in some embodiments, performing a sweep may include performing multiple, faster sub-sweeps by driving a signal source 37 using a signal that repeats multiple times during the duration of the sweep (e.g., four linear sub-sweeps from 5 Hz to 90 Hz, each of which lasting 10 seconds).

Figure 4A:
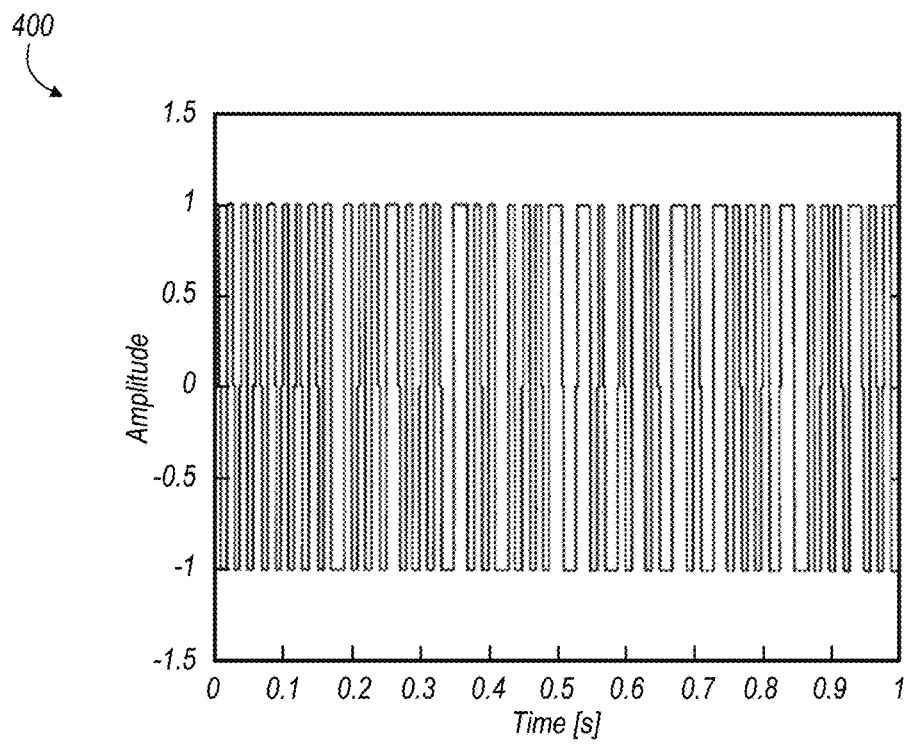
FIGS. 4A-4B are graphs of example seismic signals, according to some embodiments.
Figure 4B:
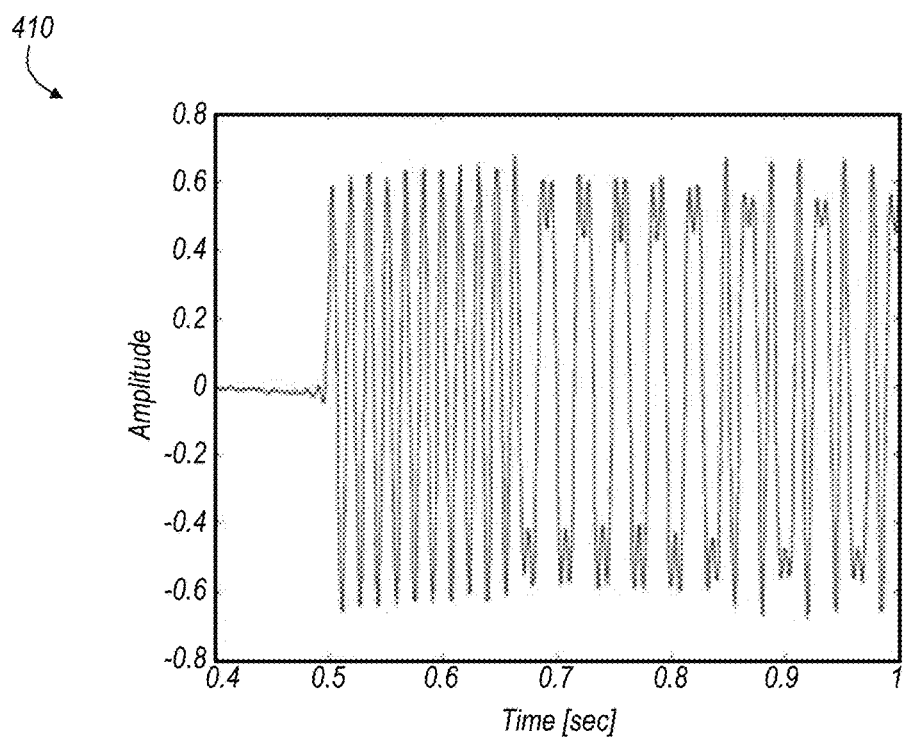

Turning now to FIGS. 4A and 4B, graphs 400 and 410 depict example digital codes that may be used to drive one or more signal sources 37 to perform one or more sweeps, according to some embodiments.

Note that, in various embodiments, one or more of signal sources 37 may be vibratory signal sources configured to operate simultaneously using orthogonal digital codes, such that sensor measurements based on energy emitted from the different sources 37 can be differentiated. For example, U.S. Pat. No. 8,094,514 titled "Seismic Vibrator Array and Method for Using" discusses example designs of vibratory sources and techniques for distinguishing between signals from different vibratory sources when operating simultaneously. Gold codes and m-sequences are examples of digital codes that may be used to drive vibratory signal sources 37, and such digital codes may have little or no cross-correlation between different codes. Cross-correlation of received signals with known codes used to drive the sources may allow separation of signals from different sources. Generally speaking, digital codes may be used to drive different vibratory signal sources 37 where the codes are uncorrelated to at least a threshold degree to facilitate separation of signals from different vibratory sources. During simultaneous operation, different vibratory signal sources 37 may perform sweeps using different digital codes (e.g., Gold codes) at the same time, the recovered data from which may be subsequently separated (e.g., through cross-correlation).

FIG. 4A shows graph 400, which depicts an example Gold code that may be used to drive one or more vibratory signal sources 37 while performing a portion of a sweep, such as sweep 200 or sub-sweeps 200A or 200B of FIG. 2A. For example, in one embodiment, performing sweep 200 may include driving a vibratory signal source 37 based on a first Gold code to perform sub-sweep 200A, and driving the vibratory signal source 37 based on a second Gold code to perform sub-sweep 200B. FIG. 4B shows graph 410, which depicts an example m-sequence that may be used to drive one or more vibratory sources 37 while performing a portion of a sweep, such as sweep 200 or sub-sweeps 200A or 200B of FIG. 2A. For example, in one embodiment, performing sweep 200 may include driving a vibratory signal source 37 based on a first m-sequence to perform sub-sweep 200A, and driving the vibratory signal source 37 based on a second m-sequence to perform sub-sweep 200B. Further, in some embodiments, multiple signal sources 37 may be used to perform sweeps simultaneously, with each signal source 37 being driven using a different orthogonal digital code (e.g., Gold code, m-sequence, etc.) such that the recovered data may be separated. Further, the data recovered based on such simultaneous operation may be used to selectively image various portions of a geological formation, as discussed herein.

Note that only a portion of the digital codes used to drive one or more signal sources 37 during a given sweep are shown in graphs 400 and 410 for clarity. In various embodiments, the one or more signal sources 37 may be continuously driven using digital codes for the entire time interval (e.g., 40 seconds) of a given sweep.

Figure 4C:
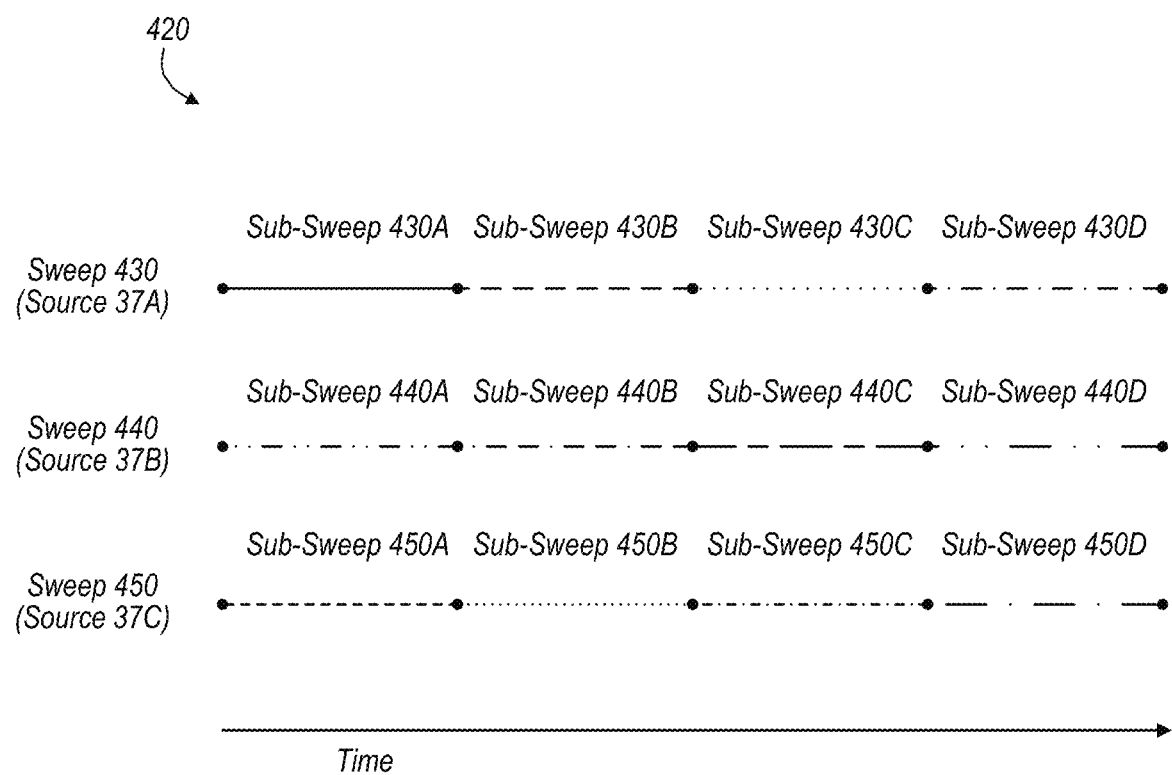
FIG. 4C is a diagram illustrating example sweeps, according to some embodiments.

As noted, multiple signal sources 37 may be simultaneously operated using digital codes that are uncorrelated to at least a threshold degree (e.g., orthogonal codes) such that the recovered data may be separated and used to generate imaging data corresponding to various portions of geological formations. In FIG. 4C, a diagram 420 corresponding to example sweeps 430-450 is shown, according to some embodiments. In various embodiments, sweeps 430-450 may correspond to sweeps simultaneously performed by three signal sources 37A-37C, respectively, of FIG. 1.

In various embodiments, each of sweeps 430-450 may be performed during a given time interval using a different vibratory signal source 37. Further, each of sweeps 430-450 may be performed by driving the respective vibratory signal sources 37 according to different digital codes that are uncorrelated to at least a threshold degree. For example, sweep 430 may be performed by driving signal source 37A using a first digital code (e.g., a first Gold code), sweep 440 may be performed by driving signal source 37B using a second digital code (e.g., a second Gold code), and sweep 450 may be performed by driving signal source 37 using a third digital code (e.g., a third Gold code).

Further, in some embodiments, the digital codes used to perform sweeps 430-450 may, in turn, each include a plurality of sub-sections. For example, as shown in FIG. 4C, each of sweeps 430-450 includes multiple sub-sweeps. Namely, sweep 430 includes sub-sweeps 430A-430D, sweep 440 includes sub-sweeps 440A-440D, and sweep 450 includes sub-sweeps 450A-450D. In various embodiments, one or more of the sub-sweeps in a given sweep may be uncorrelated, to at least a threshold degree, relative to other sub-sweeps in the given sweep. For example, in one embodiment, sub-sweeps 430A-430D may each be performed based on a different Gold code. That is, sub-sweep 430A may be performed by driving vibratory signal source 37A based on a first Gold code, sub-sweep 430B may be performed by driving vibratory signal source 37A based on a second Gold code, sub-sweep 430C may be performed by driving vibratory signal source 37A based on a third Gold code, and sub-sweep 430D may be performed by driving vibratory signal source 37A based on a fourth Gold code.

In FIG. 4C, differing patterns are used to denote sub-sweeps performed based on digital codes (e.g., Gold codes, m-sequences, etc.) that are uncorrelated to at least a threshold degree. In various embodiments, the digital codes used to drive different sources 37 at a given time are uncorrelated to at least a threshold degree, such that the recovered signals based on the sub-sweeps may be separated. For example, in FIG. 4C, to perform sub-sweeps 430A, 440A, and 450A (which, in the depicted embodiment, are performed concurrently), sources 37A-37C may be respectively driven based on digital codes that are uncorrelated to at least a threshold degree. Similarly, to perform sub-sweeps 430B-450B, 430C-450C, and 430D-450D, sources 37A-37C may be respectively driven based on digital codes that are uncorrelated to at least a threshold degree. Note that this embodiment is provided merely as an example, and various combinations of uncorrelated digital codes may be used to drive signal sources 37A-37C during a given sweep. As noted above, however, in embodiments in which sweeps or sub-sweeps are performed simultaneously, the digital codes used to drive the vibratory signal sources may be required to be uncorrelated to at least a threshold degree to facilitate separation of resulting seismic signals received by sensors 22.

Further note that, although all sub-sweeps shown in FIG. 4C are of equal length, this embodiment is provided merely as an example. In other embodiments, one or more of the sub-sweeps may be of a different length relative to other sub-sweeps in its respective sweep or relative to sub-sweeps in other sweeps. For example, in one embodiment, sub-sweep 440A may be of a different length (e.g., longer, shorter) than sub-sweep 440B. Further, in one embodiment, sub-sweep 440A of sweep 440 may be of a different length than sub-sweep 450A of sweep 450. In various embodiments, performing sweeps in which one sub-sweep is of a different length relative to other sub-sweeps may be particularly advantageous for compressive sensing data acquisition and reconstruction techniques. Note that, regardless of the length of a given sub-sweep, it may be advantageous in embodiments in which simultaneous sweeps are performed for the digital codes used to perform the sweeps on different vibratory signal sources 37 to be uncorrelated to at least a threshold degree to facilitate separation of the resulting signals. For example, in an embodiment in which sub-sweep 440A is longer than sub-sweep 450A, sub-sweep 440A may overlap with both sub-sweeps 450A and 450B. In such an embodiment, it may be desirable for the digital code used to perform sub-sweep 440A to be uncorrelated (to at least a threshold degree) relative to the digital codes used to perform both sub-sweep 450A and 450B.

Figure 5:
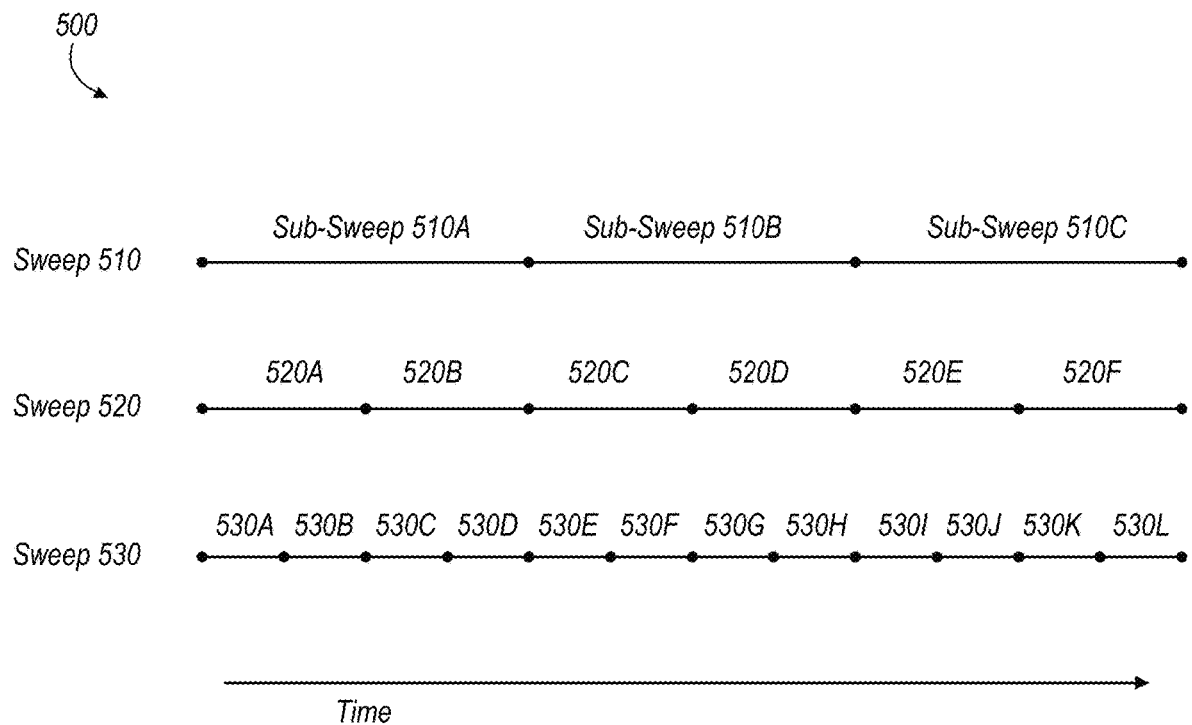
FIG. 5 is a diagram illustrating example sweeps, according to some embodiments.

Referring now to FIG. 5, a diagram 500 corresponding to example sweeps 510-530 is shown, according to some embodiments. In various embodiments, sweeps 510-530 may correspond to sweeps of various lengths that may be performed by one or more of signal source 37 of FIG. 1.

As shown in FIG. 5, each of sweeps 510-530 includes multiple sub-sweeps. More specifically, sweep 510 includes three sub-sweeps (510A-510C), sweep 520 includes six sub-sweeps (520A-520F), and sweep 530 includes twelve sub-sweeps (530A-530L). As discussed above with reference to FIG. 4C, one or more of the sub-sweeps shown in FIG. 5 may be performed by driving one or more signal sources 37 based on one or more digital codes. For example, in some embodiments, each of the sub-sweeps in a given sweep may be performed based on different digital codes that are uncorrelated to at least a threshold degree (e.g. Gold codes, m-sequences, etc.).

Further, in various embodiments, the number of bits included in a digital code used to perform a given sub-sweep may vary based on the length of that given sub-sweep (and/or different numbers of bits may be used for different sub-sweeps having the same length). For example, in one embodiment, each of sub-sweeps 510A-510C may be performed by a signal source 37 in 40 seconds, with the digital codes used to drive the signal source 37 each including 1024 bits. Further, in such an embodiment, each of sub-sweeps 520A-520F may be performed by a signal source 37 in 20 seconds, with the digital codes used to drive the signal source 37 each including 512 bits, and each of sub-sweeps 530A-530L may be performed by a signal source 37 in 10 seconds, with the digital codes used to drive the signal source 37 each including 256 bits. Note, however, that this embodiment is provided merely as an example, and sub-sweeps in other embodiments may include different numbers of bits over different durations.

Further note that, although each of the sub-sweeps in a given sweep are of the same length in the depicted embodiment, sub-sweeps of different length may be performed within a given sweep. For example, in one embodiment, performing a sweep may include performing two sub-sweeps of a first length (e.g., sub-sweeps 510A and 510B) followed by two sub-sweeps of a different length (e.g., sub-sweeps 520E and 520F). Additionally, in some embodiments, different signal sources 37 may perform sweeps with sub-sweeps of different lengths. For example, in one embodiment, sweeps 510 and 520 may be performed simultaneously by vibratory signal sources 37A and 37B, respectively. In such an embodiment, ones of sub-sweeps 520A-520F will be of different length than ones of sub-sweeps 510A-510C. Note that it may be advantageous in such embodiments for the digital codes used to perform the sub-sweeps on different vibratory signal sources 37 to be uncorrelated to at least a threshold degree to facilitate separation of the resulting signals.

In some embodiments, sub-sweep parameters (e.g., the length of codes used to drive sub-sweeps, their time intervals, etc.) may be varied based on a model generated for a planned survey. For example, longer sub-sweeps may be used when imaging relatively deeper formations, although portions of those sub-sweeps may still be used for imaging shallower portions of those formations.

In various embodiments, the data received based on any of sweeps 510-530 may be selectively used to image various portions of a geophysical structure. For example, in an embodiment in which sweep 530 is performed during a geophysical survey, imaging data corresponding to various portions of a geological formation may be generated (e.g., through autocorrelation) based on the entire sweep 530 (that is, sub-sweeps 530A-530L), multiple sub-sweeps (e.g., sub-sweeps 530A-530D), a single sub-sweep (e.g., sub-sweep 530C) or a portion of a sub-sweep (e.g., a first half of sub-sweep 530H). In one particular embodiment, for example, imaging data corresponding to a first location of a geological formation may be generated using an autocorrelation of only sub-sweep 530E with the seismic data, imaging data corresponding to a second location may be generated using an autocorrelation of only sub-sweep 530F with the seismic data, and imaging data corresponding to a third location may be generated using an autocorrelation of both sub-sections 530E and 530F with the seismic data. In such an embodiment, the third location may be at a depth that is greater than the depths associated with either of the first location or the second location (which may be at different depths).

Figure 6:
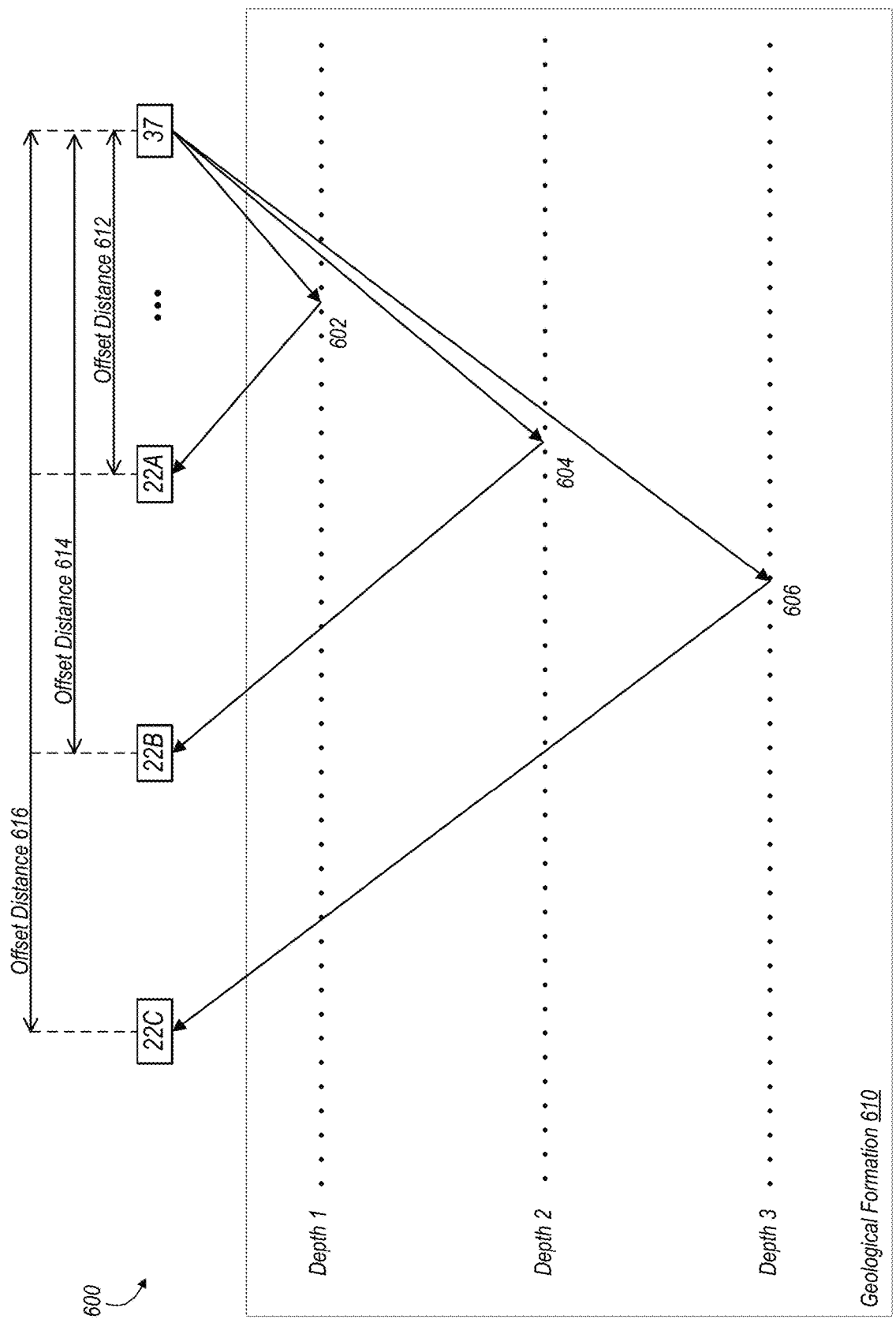
FIG. 6 is a block diagram illustrating a portion of a geophysical survey system, according to some embodiments.

Turning now to FIG. 6, a block diagram 600 of a portion of a geophysical survey system is shown, looking along a sail line from behind the streamer spread, according to some embodiments. Note that, for clarity, block diagram 600 depicts only a portion of the left side of survey system 100 of FIG. 1.

Block diagram 600 includes signal source 37 (e.g., a vibratory signal source), a plurality of geophysical sensors 22 (e.g., disposed in respective streamers 20 (not shown)), and geological formation 610. As shown in FIG. 6, sensors 22A-22C are positioned at different offsets from signal source 37. As used herein, the term "offset" is used according to its ordinary meaning in the art, which includes a distance between a source and a point on a streamer array (e.g., a location of a sensor). If the source and point are at the same depth, then the offset distance is in a direction parallel to the surface of the water. If the source and point are at different depths, the offset distance may or may not be measured parallel to the surface of the water, e.g., depending on processing techniques.

In various embodiments, as signal source 37 performs a sweep, seismic signals generated by the signal source 37 may be transmitted to geological formation 610 disposed beneath body of water 11 and then reflected and captured by geophysical sensors 22A-22C at the various offsets. For example, as shown in FIG. 6, seismic signals generated by signal source 37 may be reflected from location 602 (at depth 1) of geological formation 610 and captured by sensors 22A. Seismic signals generated by signal source 37 may be reflected from location 604 (at depth 2) of geological formation 610 and captured by sensors 22B at streamer. Further, seismic signals generated by signal source 37 may be reflected from location 606 (at depth 3) of geological formation 610 and captured by sensors 22C.

In various embodiments, locations 602-606 may correspond to different offset distances between signal source 37 and the sensors 22 by which the seismic data are captured. For example, in one embodiment, location 602 may correspond to an offset distance 612 between signal source 37 and sensor 22A used to record the seismic data. Further, in one embodiment, location 604 may correspond to an offset distance 614 between signal source 37 and sensor 22B used to record the seismic data. Additionally, location 606 may correspond to an offset distance 616 between signal source 37 and a third sensor 22C used to record the seismic data.

Further, in various embodiment, generating imaging data for different locations of geological formation 610 may use data captured by different sensors 22. For example, in one embodiment, imaging locations 602 and 604 may use different first and second sensors 22A and 22B, respectively.

As noted above, the disclosed systems and methods may be used to selectively image various locations of geological formation 610. For example, consider an embodiment in which signal source 37 of FIG. 6 is used to perform sweep 430 as shown in FIG. 4C. Further, assume that, in sweep 430, each of the sub-sweeps 430A-430D is 10 seconds in duration, and each of the sub-sweeps 430A-430D is performed based on a different Gold code (Gold codes A-D, respectively). In such an embodiment, imaging location 602 of geological formation 610 may be performed using a correlation of Gold code A with the seismic data received by sensor 22A. Further, in such an embodiment, imaging location 604 may be performed using a correlation of Gold codes A and B with the seismic data received by sensor 22B. Similarly, in such an embodiment, imaging location 606 may be performed using a correlation of Gold codes A, B, and C with the seismic data received by sensor 22C.

Note that only three locations and three depths are shown FIG. 6 for clarity. In various embodiments, however, the disclosed systems and methods may be used to collect geophysical data corresponding to numerous locations at any number of depths of a geological formation. Further note that the embodiment depicted in FIG. 6 is provided merely as an example, and the systems and methods described herein are not limited to any particular offset configuration.

Example Methods

Figure 7:
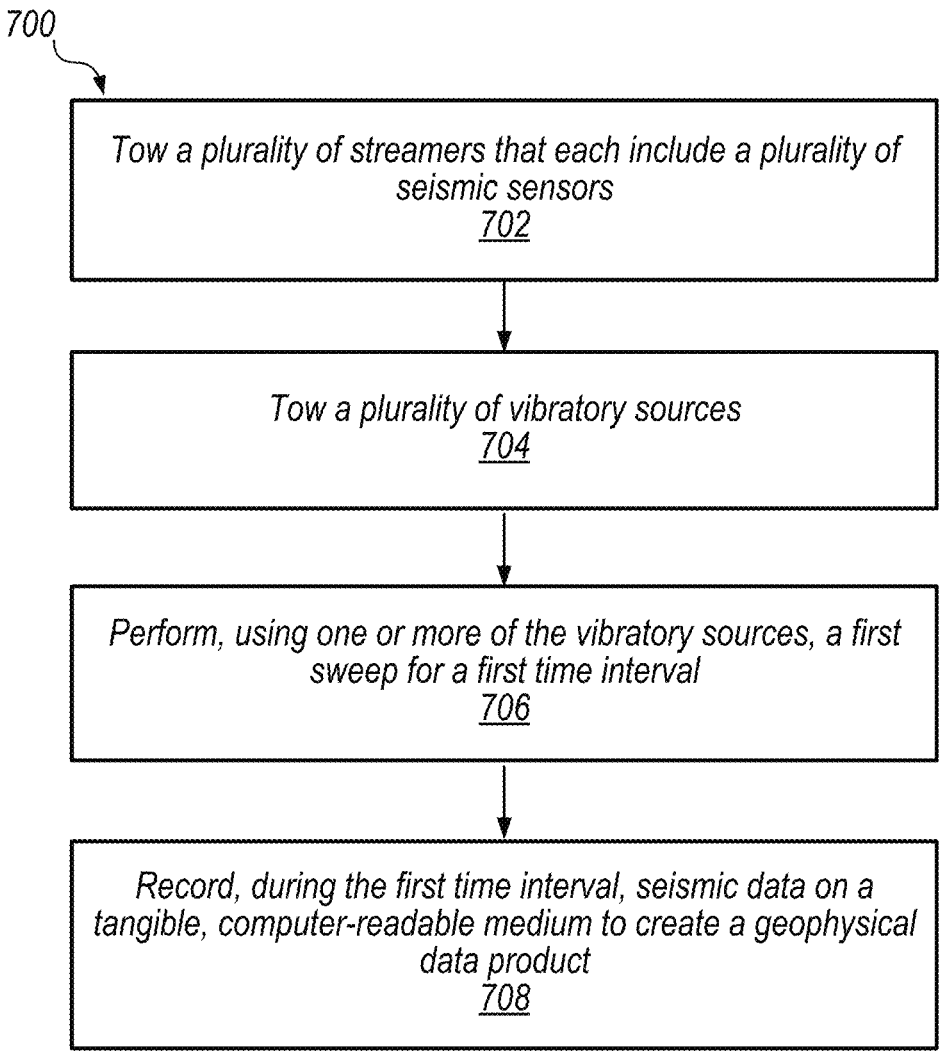
FIGS. 7-8 are flow diagrams illustrating example methods for manufacturing a geophysical data product, according to some embodiments.
Figure 8:
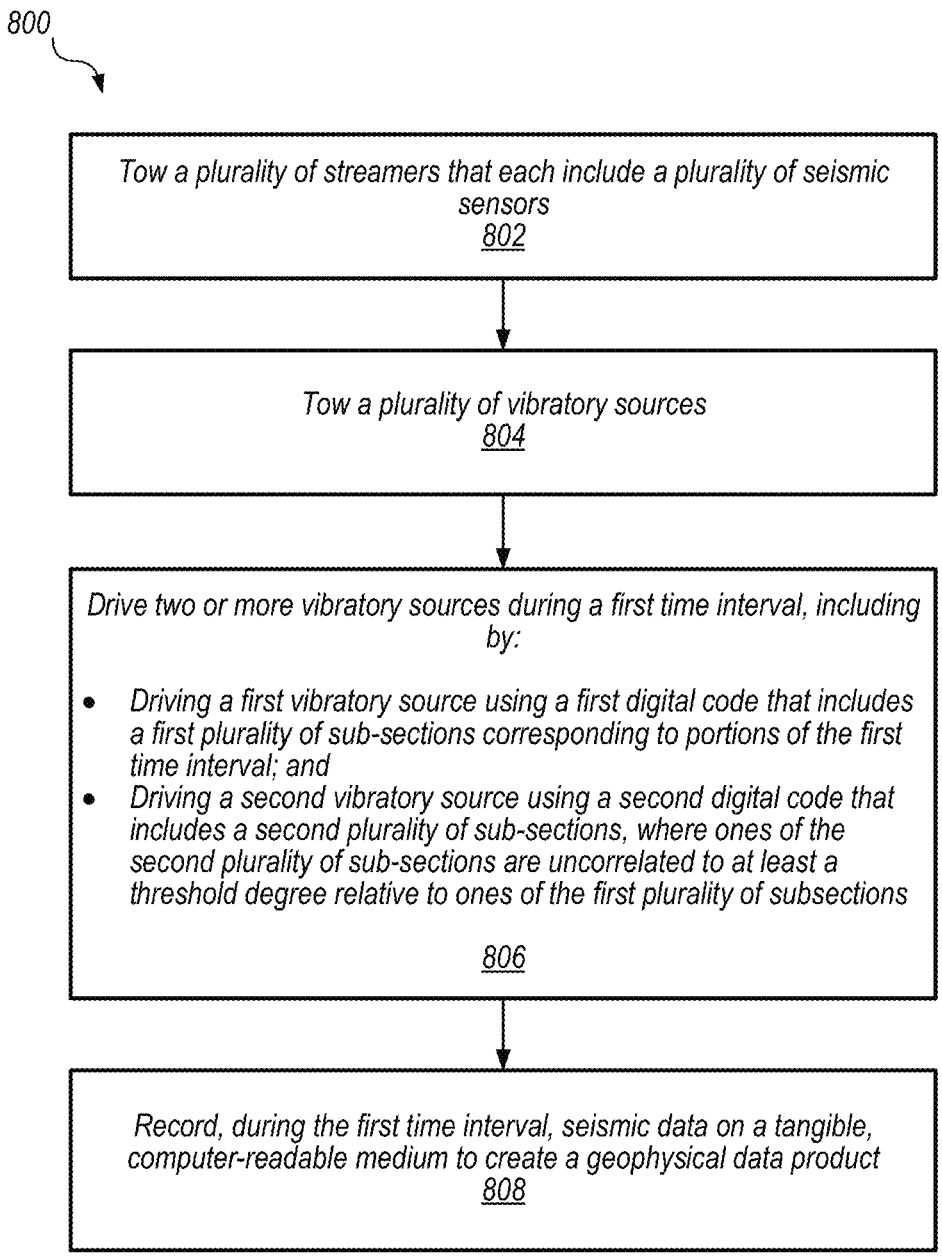

Turning now to FIGS. 7 and 8, flow diagrams for example methods 700 and 800 are respectively depicted. In various embodiments, methods 700 and 800 may be used to manufacture a geophysical data product that includes data corresponding to various portions of a geological formation. In various embodiments, methods 700 and 800 may be performed, for example, using geophysical survey system 100 of FIG. 1.

In FIG. 7, method 700 includes elements 702-708. While these elements are shown in a particular order for ease of understanding, other orders may be used. In various embodiments, some of the method elements may be performed concurrently, in a different order than shown, or may be omitted. Additional method elements may also be performed as desired. At element 702, in the illustrated embodiment, the survey system tows a plurality of streamers that each include a plurality of seismic sensors. For example, as shown in FIG. 1, survey vessel 10 may be configured to tow a plurality of streamers 20 that each include a plurality of seismic sensors 22. Method 700 then proceeds to element 704. At 704, in the illustrated embodiment, the survey system tows a plurality of vibratory sources. For example, survey vessel 10 may be configured to tow one or more vibratory sources 37.

Method 700 then proceeds to element 706. At 706, in the illustrated embodiment, the survey system performs, using one or more of the plurality of vibratory sources, a first sweep for a first time interval. As discussed above with reference to FIG. 3, performing a first sweep may include driving a vibratory source 37 according to a function, such as a linearly increasing function, a random function, etc., according to various embodiments. For example, in some embodiments, performing the first sweep may include driving a first vibratory source to generate seismic signals that begin at a first frequency and linearly change to a second frequency. In one embodiment, the generated seismic signals may linearly increase from the first frequency to the second, higher frequency, for example. In other embodiments, however, performing the first sweep may include driving a first vibratory source to generate seismic signals that include a pseudo-random distribution of frequency components within a given frequency range.

As noted above, in various embodiments, a survey system 100 may include both low-frequency and high-frequency vibratory sources. In such embodiments, element 706 may include driving the low-frequency vibratory source, for a first portion of the time interval, to perform a low-frequency portion of the first sweep, and then subsequently driving the high-frequency vibratory source, for a second portion of the first time interval, to perform a higher-frequency portion of the first sweep. In such embodiments, the relative length of time spent on the low- and higher-frequency portions of the first sweep may vary. For example, in some embodiments, the first portion of the first time interval may be of equal length to the second portion of the first time interval, such that an equal amount of time is spent on the low- and higher-frequency portions of the sweep. In other embodiments, however, the first portion of the first time interval may be longer or shorter than the second portion of the first time interval, such that a larger portion of the first sweep may be used for the low-frequency or higher-frequency portions, respectively.

Further, in various embodiments, the first sweep may include a first plurality of sub-sweeps that correspond to portions of the first time interval. For example, in one embodiment, performing the first sweep may include performing, using a first vibratory source, a first sub-sweep for a first portion of the first time interval. In such an embodiment, performing the first sub-sweep may include activating the first vibratory source based on a first digital code (e.g., a first Gold code). Further, in such an embodiment, performing the first sweep may include subsequently performing, using the first vibratory source, a second sub-sweep for a second portion of the first time interval, where performing the second sub-sweep includes activating the first vibratory source based on a second digital code (e.g., a second Gold code). In such an embodiment, the seismic data recorded during the seismic survey may include data based on the first sub-sweep and the second sub-sweep.

Note that, in some embodiments, method 700 may include performing a second sweep during the first time interval. For example, in some embodiments, control equipment 12 may be configured to perform, using a second vibratory source, a second sweep during the first time interval, where the second sweep includes a second plurality of sub-sweeps. In such embodiments, various ones of the second plurality of sub-sweeps may be uncorrelated to at least a threshold degree relative to ones of the first plurality of sub-sweeps, as discussed above with reference to FIG. 4D.

Method 700 then proceeds to element 708. At 708, in the illustrated embodiment, the survey system records, during the first time interval, seismic data on a tangible, computer-readable medium to create a geophysical data product. For example, in various embodiments, survey system 100 may continuously record, using ones of seismic sensors 22 of FIG. 1, seismic data during the first time interval, where the seismic data is based on the seismic signals generated by performing the first sweep.

Referring now to FIG. 8, a flow diagram of an example method 800 for acquiring geophysical survey data is shown, according to some embodiments. In FIG. 8, method 800 includes elements 802-808. While these elements are shown in a particular order for ease of understanding, other orders may be used. In various embodiments, some of the method elements may be performed concurrently, in a different order than shown, or may be omitted. Additional method elements may also be performed as desired.

At 802, in the illustrated embodiment, the survey system tows a plurality of streamers that each include a plurality of seismic sensors. For example, as shown in FIG. 1, survey vessel 10 may be configured to tow a plurality of streamers 20 that each include a plurality of seismic sensors 22. Method 800 then proceeds to element 804. At 804, in the illustrated embodiment, the survey system tows a plurality of vibratory sources. For example, survey vessel 10 may be configured to tow one or more vibratory sources 37.

Method 800 then proceeds to element 806. At 806, in the illustrated embodiment, the survey system drives two or more vibratory sources during a first time interval. As shown in element 806, driving the two or more vibratory sources may include, in some embodiments, driving a first vibratory source using a first digital code that includes a first plurality of sub-sections corresponding to portions of the first time interval. For example, in one embodiment, performing the first sweep may include continuously driving the first vibratory source based on one or more digital codes (e.g., Gold codes) during the first time interval. Further, as shown in element 806, driving the two or more vibratory sources may further include driving a second vibratory source using a second digital code that includes a second plurality of sub-sections, where ones of the second plurality of sub-sections are uncorrelated to at least a threshold degree relative to ones of the first plurality of sub-sections.

Method 800 then proceeds to element 808. At 808, in the illustrated embodiment, the survey system records, during the first time interval, seismic data on a tangible, computer-readable medium to create a geophysical data product. For example, in various embodiments, survey system 100 may continuously record, using ones of seismic sensors 22 of FIG. 1, seismic data during the first time interval, where the seismic data is based on seismic signals generated by driving the first vibratory source using the first digital code and the second vibratory source using the second digital code.

In some embodiments, method 800 may further include imaging, by the computer system, a location of the geological formation using a correlation of an entirety of the first digital code with the seismic data. Further, in some embodiments, method 800 may include imaging another location of the geological formation using a correlation of a portion of one of the first plurality of sub-sections with the seismic data.

Turning now to FIGS. 9 and 10, flow diagrams for example methods 900 and 1000 are respectively depicted. In various embodiments, methods 900 and 1000 may be used to generate imaging data corresponding to various portions of a geological formation. In some embodiments, methods 900 or 1000 may be initiated or performed by one or more processors in response to one or more instructions stored by computer-readable media.

In FIG. 9, method 900 includes elements 902-906. While these elements are shown in a particular order for ease of understanding, other orders may be used. In various embodiments, some of the method elements may be performed concurrently, in a different order than shown, or may be omitted. Additional method elements may also be performed as desired. At element 902, a computer system accesses seismic data for a geological formation, where the seismic data is recorded, using one or more sensors, during a seismic survey in which one or more of a plurality of vibratory sources were used to perform a first sweep during a first time interval. For example, in some embodiments, element 902 may include accessing seismic data that was recorded during a seismic survey as described above with reference to FIG. 7.

Method 900 then proceeds to element 904. At 904, the computer system images a first location of the geological formation using a correlation of only a first portion of the first sweep with the seismic data. In some embodiments, the first portion of the first sweep may include a subset of the frequency components that are included in the entirety of the first sweep. Further, in some embodiments, the first location is at a first, relatively shallow depth of the geological formation, and imaging the first location may generate first imaging data with a first spatial resolution and a first signal-to-noise ratio.

Method 900 then proceeds to element 906, which includes imaging, by the computer system, a second location of the geological formation using a correlation of multiple sub-sweeps or an entirety of the first sweep with the seismic data. For example, in some embodiments, the second location is at a second depth that is greater than the first location. Further, in various embodiments, imaging the second location may generate second imaging data with a second spatial resolution that is lower than the first spatial resolution, but a second signal-to-noise ratio that is greater than the first signal-to-noise ratio.

Note that, in some embodiments, method 900 may further include imaging, by the computer system, a third location of the geological formation using a correlation of only a second portion of the first sweep with the seismic data. In some such embodiments, the second location may be at a second depth that is greater than both the first depth associated with the first location and a third depth associated with the third location.

Further, in some embodiments, the seismic survey used to acquire the seismic data may include performing a second sweep, using one or more of the vibratory sources, upon completion of the first sweep. In such embodiments, method 900 may further include imaging, by the computer system, a location of the geological formation using a correlation of a combination of the first and second sweeps with the seismic data.

In some embodiments, elements 904-906, and their corresponding equivalents discussed herein, may be referred to as means for imaging a first location of the geological formation using a correlation of a first portion of the first sweep with the seismic data and means for imaging a second location of the geological formation using a correlation of multiple sub-sweeps or an entirety of the first sweep with the seismic data, respectively.

Referring now to FIG. 10, a flow diagram of an example method 1000 for generating imaging data corresponding to various portions of a geological formation is shown, according to some embodiments. In FIG. 10, method 1000 includes elements 1002-1006. While these elements are shown in a particular order for ease of understanding, other orders may be used. In various embodiments, some of the method elements may be performed concurrently, in a different order than shown, or may be omitted. Additional method elements may also be performed as desired.

At 1002, in the illustrated embodiment, a computer system accesses seismic data for a geological formation, where the seismic data is recorded during a seismic survey in which a first vibratory source was driven using a first digital code for at least a first time interval, and where the first digital code includes a first plurality of sub-sections corresponding to portions of the first time interval. In some embodiments, for example, element 1002 may include accessing seismic data that was recorded during a seismic survey as described above with reference to FIG. 8.

Method 1000 then proceeds to element 1004. At 1004, in the illustrated embodiment, the computer system images a first location of the geological formation using a correlation of only one of the first plurality of subsections with the seismic data. In some embodiments, the first location may be at a first depth of the geological formation, and imaging the first location may generate first imaging data with a first spatial resolution and a first signal-to-noise ratio.

Method 1000 then proceeds to element 1006. At 1006, in the illustrated embodiment, the computer system images a second location of the geological formation using a correlation of multiple sub-sweeps or an entirety of the first sweep with the seismic data. In some embodiments, the second location may be at a second depth that is greater than the first depth. Further, in various embodiments, imaging the second location may generate second imaging data with a second spatial resolution that is lower than the first spatial resolution and a second signal-to-noise ratio that is greater than the first signal to noise ratio.

Note that, in some embodiments, method 1000 may further include imaging, by the computer system, a third location of the geological formation using a correlation of an entirety of the first digital code with the seismic data. For example, in embodiments in which the third location is at a greater depth than the second location, method 1000 may include imaging the third location based on the entirety of the first digital code. In some embodiments, method 1000 may further include imaging, by the computer system, a fourth location of the geological formation using a partial correlation, that is using a correlation of a portion of one of the first plurality of sub-sections with the seismic data. In some embodiments, method 1000 may include imaging a fifth location of the geological formation using a correlation of only a second sub-section of the first plurality of sub-sections with the seismic data. In such embodiments, the second location may be at a second depth that is greater than both the first and third depths associated with the first and third locations, respectively.

As noted above, multiple signal sources 37 may be simultaneously operated using digital codes that are uncorrelated to at least a threshold degree, according to some embodiments. For example, during the seismic survey, a second vibratory source of the plurality of vibratory sources may be driven using a second digital code during the first time interval. In such an embodiment, the second digital code may include a second plurality of sub-sections such that, during time intervals corresponding in length to the sub-sections in the first time interval, ones of the second plurality of sub-sections are uncorrelated, to at least a threshold degree, relative to ones of the first plurality of sub-sections.

Further, in some embodiments, method 1000 may include imaging a location of the geological formation based on multiple Gold codes. For example, in one embodiment, during the seismic survey, the first vibratory source may be subsequently driven using a second digital code (e.g., after being driven using the first digital code) for at least a second time interval. In such embodiments, method 1000 may further include imaging, by the computer system, a location of the geological formation using a correlation of a combination of the first and second digital codes with the seismic data.

In some embodiments, elements 1004-1006, and their corresponding equivalents discussed herein, may be referred to as means for imaging a first location of the geological formation using a correlation of only one of the first plurality of sub-sections with the seismic data, and means for imaging a second location of the geological formation using a correlation of two or more of the first plurality of sub-sections with the seismic data, respectively.

Example Seismic Images

Figure 11A:
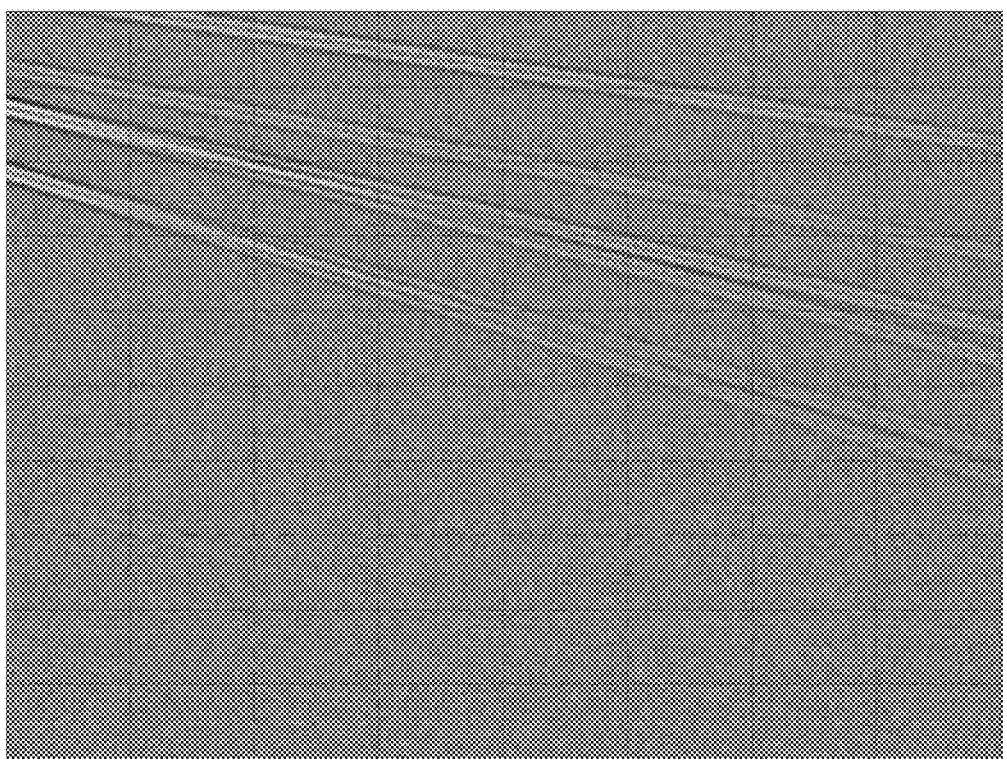
FIGS. 11A-11D show example seismic images, according to one embodiment.
Figure 11B:
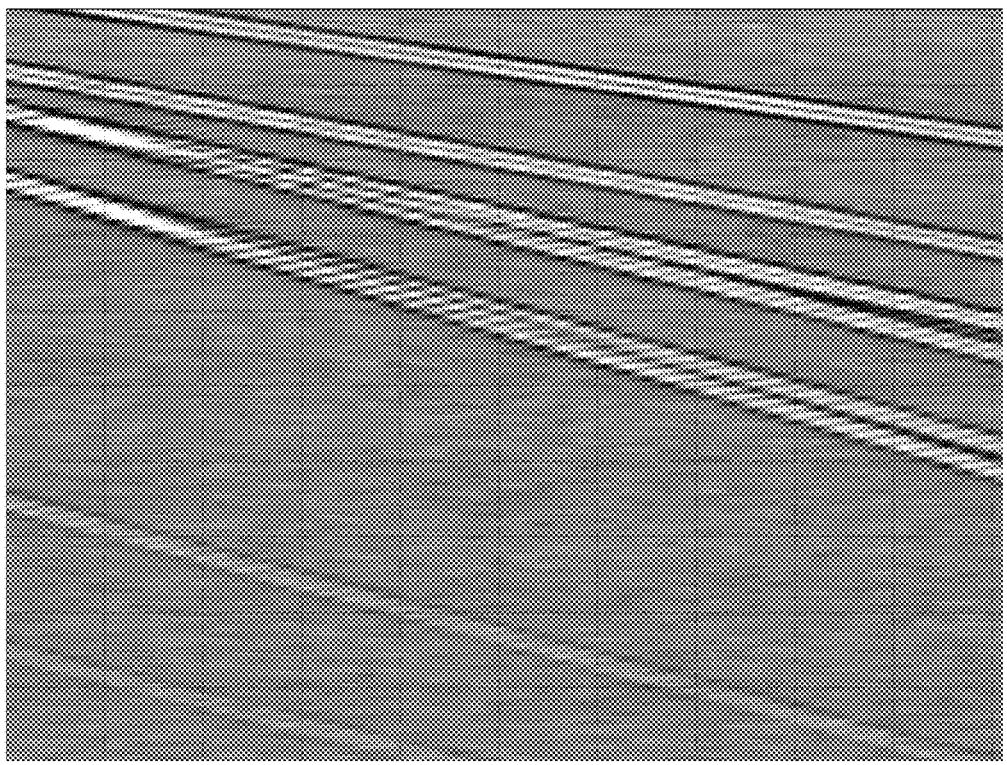
Figure 11C:
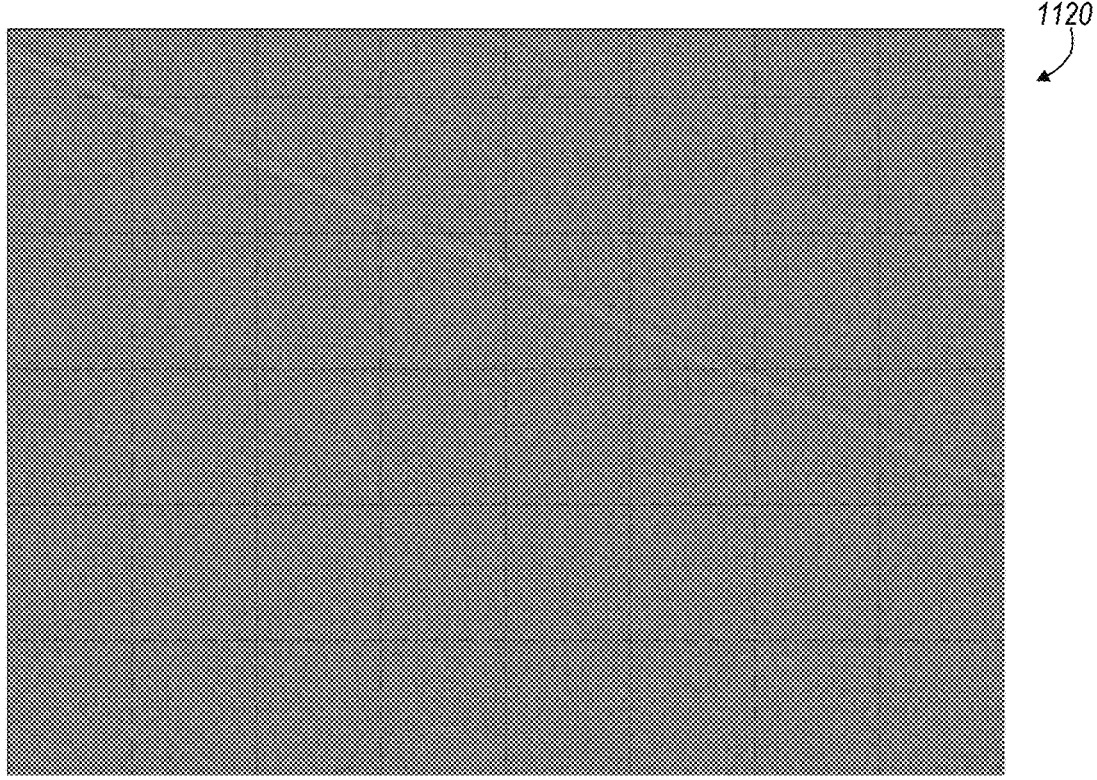
Figure 11D:
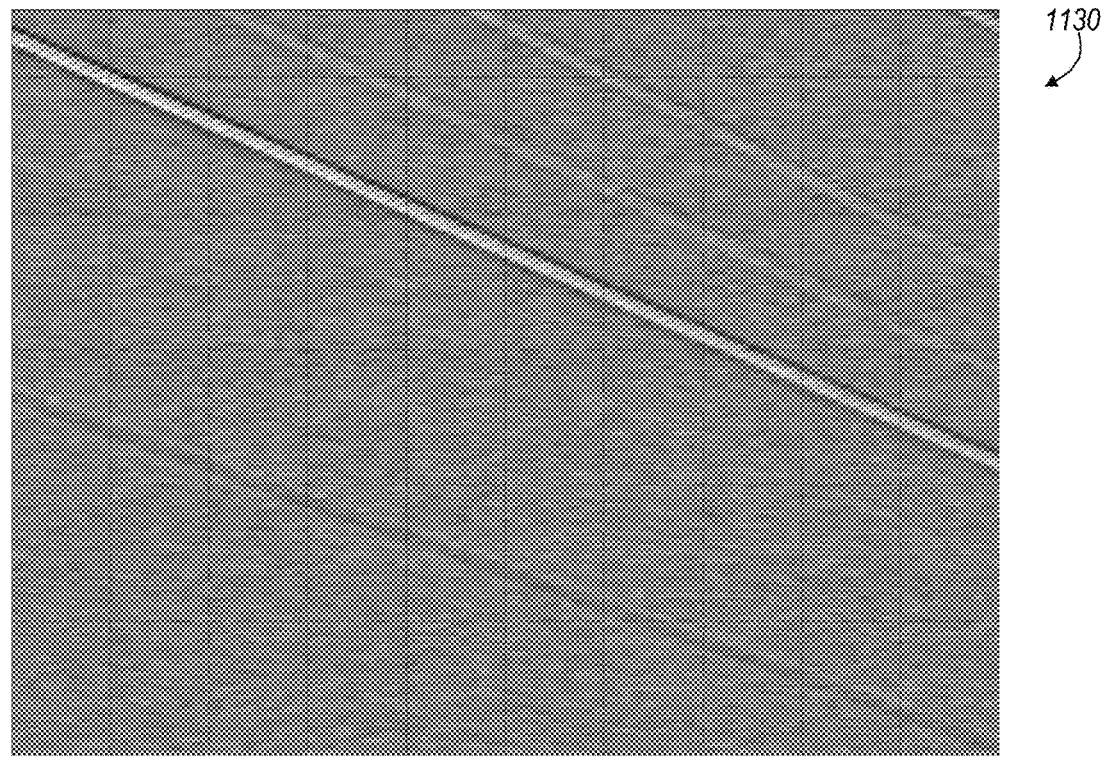

Referring now to FIGS. 11A-11D, example seismic images 1100-1130 are respectively shown, according to some embodiments. More particularly, in the depicted embodiment, FIGS. 11A and 11B show seismic images 1100 and 1110, respectively, that both correspond to the same relatively-shallow portion of a geological formation. Similarly, in the depicted embodiment, FIGS. 11C and 11D show seismic images 1120 and 1130, respectively that both correspond to the same relatively-deep portion of a geological formation.

In various embodiments, seismic images 1100-1130 may be generated based on geophysical data collected during seismic surveys performed according to disclosed systems and methods. For example, in some embodiments, seismic data may be acquired based on a seismic survey performed, at least in part, according to methods 700 or 800 discussed above. Further, in some such embodiments, seismic images 1100-1130 may be generated from such seismic data, at least in part, according to methods 900 or 1000 discussed above.

In FIG. 11A, seismic image 1100 depicts a relatively-shallow portion of a geological formation, according to one embodiment. In the depicted embodiment, seismic image 1100 may be generated based on data corresponding to a relatively-short sweep or a portion of a sweep (e.g., 5 seconds), as discussed above. In FIG. 11B, seismic image 1110 depicts the same relatively-shallow portion of the geophysical formation, according to one embodiment. In the depicted embodiment, seismic image 1110 may be generated based on data corresponding to a longer sweep or a longer portion of a sweep (e.g., 40 seconds), as discussed above. In comparing the images in FIGS. 11A and 11B, note that, while seismic image 1110 has a higher signal-to-noise ratio relative to seismic image 1100 (as indicated by the darkened features in FIG. 11B), seismic image 1100 provides a higher resolution image than seismic image 1110 of the features in the relatively-shallow portion of the geological formation. Thus, as discussed above, it may be desirable to selectively-utilize data corresponding to shorter sweeps or portions of sweeps in generating seismic images of relatively-shallow portions of a geological formation, in some embodiments.

Turning to FIGS. 11C and 11D, seismic image 1120 depicts a relatively-deep portion of a geological formation, according to one embodiment. In the depicted embodiment, seismic image 1120 may be generated based on data corresponding to a relatively-short sweep or a portion of a sweep (e.g., 5 seconds), as discussed above. Seismic image 1130 depicts the same relatively-deep portion of the geological formation, according to one embodiment. In the depicted embodiment, seismic image 1130 may be generated based on data corresponding to a longer sweep or a longer portion of a sweep (e.g., 40 seconds), as discussed above. In comparing the images in FIGS. 11C and 11D, note that seismic image 1130 depicts detail corresponding to geological features that are not shown in seismic image 1120. This additional detail, in turn, may make seismic image 1130 more useful in locating hydrocarbon-bearing geological formations and determining where deposits of oil and natural gas may be located. Thus, as described above, it may be desirable to selectively-utilize data corresponding to longer sweeps or longer portions of sweeps in generating seismic images of relatively-deep portions of a geological formation, in some embodiments.

Thus, as described herein, the disclosed systems and methods may allow for data corresponding to various portions of one or more sweeps to be selectively combined or separated when generating imaging data, which as demonstrated by seismic images 1100-1130, may allow for improved seismic images for different portions of geological formations. Further, in various embodiments, the disclosed techniques may optimize the output energy from one or more signal sources 37 in a manner that reduces survey cost and environmental impact without reducing imaging capabilities.

Example Computing Device

Figure 12:
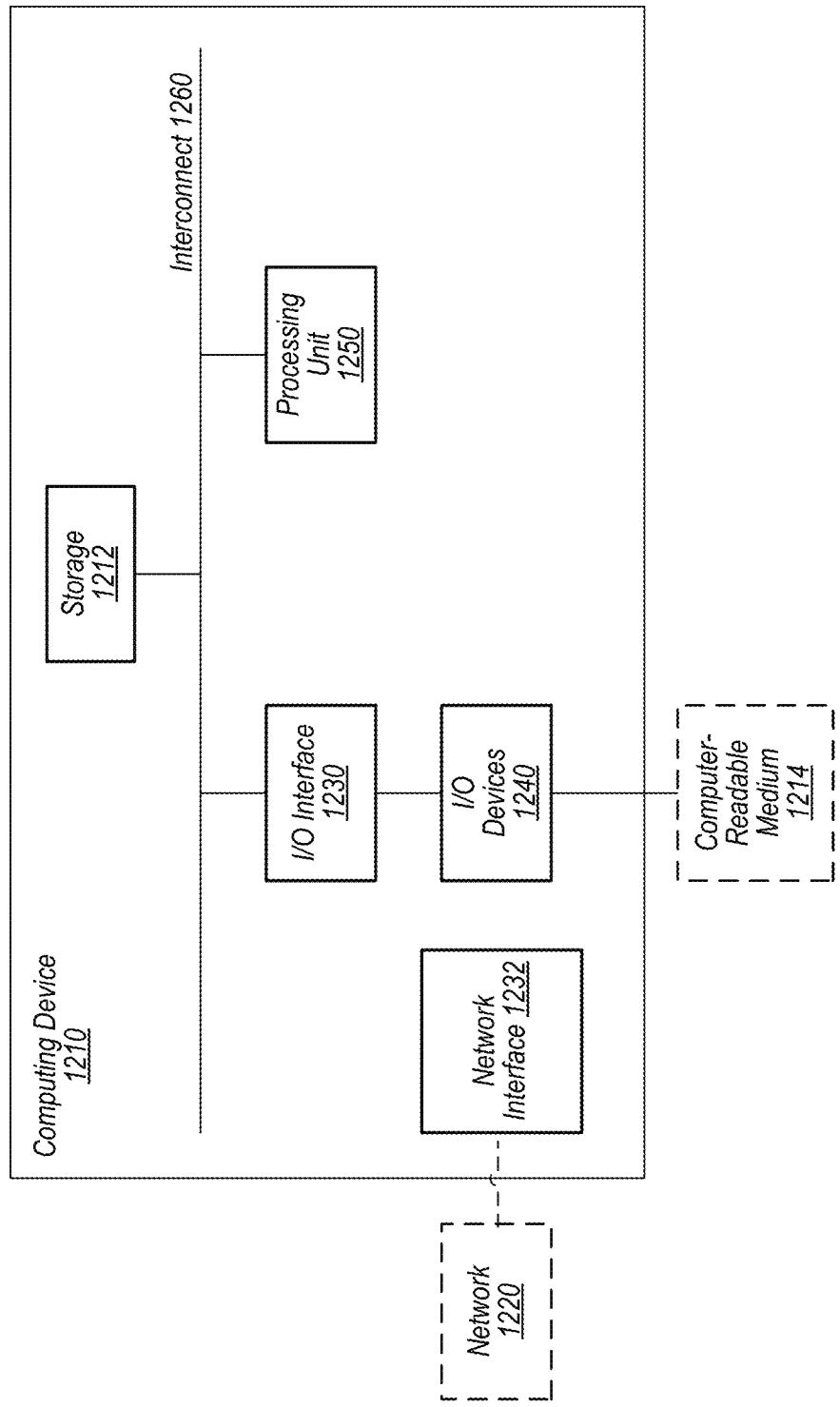
FIG. 12 is a block diagram illustrating an example computing system, according to some embodiments.

Turning now to FIG. 12, a block diagram of one embodiment of computing device (which may also be referred to as a computing system) 1210 is depicted. Computing device 1210 may be used to implement various portions of this disclosure. Computing device 1210 may be any suitable type of device, including, but not limited to, a personal computer system, desktop computer, laptop or notebook computer, mainframe computer system, web server, workstation, or network computer. As shown, computing device 1210 includes processing unit 1250, storage 1212, input/output (I/O) interface 1230 coupled via an interconnect 1260 (e.g., a system bus). I/O interface 1230 may be coupled to one or more I/O devices 1240. Computing device 1210 further includes network interface 1232, which may be coupled to network 1220 for communications with, for example, other computing devices. In the illustrated embodiment, computing device 1210 further includes computer-readable medium 1214 as a possibly distinct element from storage subsystem 1212. For example, computer-readable medium 1214 may include non-transitory, persistent, tangible storage such as tape reels, hard drives, CDs, DVDs, flash memory, optical media, holographic media, or other suitable types of storage. In some embodiments, computer-readable medium 1214 may be physically separable from computing device 1210 to facilitate transport. In some embodiments, computer-readable medium 1214 may be used to manufacture a geophysical data product. For example, in some embodiments, seismic data (generated and recorded according to any one of various disclosed embodiments) may be stored on computer-readable medium 1214, thereby completing manufacture of a geophysical data product. Although shown to be distinct from storage subsystem 1212, in some embodiments, computer-readable medium 1214 may be integrated within storage subsystem 1212.

In various embodiments, processing unit 1250 includes one or more processors. In some embodiments, processing unit 1250 includes one or more coprocessor units. In some embodiments, multiple instances of processing unit 1250 may be coupled to interconnect 1260. Processing unit 1250 (or each processor within 1250) may contain a cache or other form of on-board memory. In some embodiments, processing unit 1250 may be implemented as a general-purpose processing unit, and in other embodiments it may be implemented as a special purpose processing unit (e.g., an ASIC). In general, computing device 1210 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 1212 is usable by processing unit 1250 (e.g., to store instructions executable by and data used by processing unit 1250). Storage subsystem 1212 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1212 may consist solely of volatile memory in one embodiment. Storage subsystem 1212 may store program instructions executable by computing device 1210 using processing unit 1250, including program instructions executable to cause computing device 1210 to implement the various techniques disclosed herein.

I/O interface 1230 may represent one or more interfaces and may be any of various types of interfaces configured to couple to and communicate with other devices, according to various embodiments. In one embodiment, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. These articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., tape, CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by a computer system, seismic data for a geological formation, wherein the seismic data was recorded, using one or more sensors, during a seismic survey in which one or more vibratory sources were used to perform a sweep having a duration that defines an entire sweep time interval;
    imaging, by the computer system, a first location of the geological formation using a correlation of only a first portion of the sweep with the seismic data, wherein the first portion of the sweep corresponds to a first portion of the sweep time interval, and wherein the first portion of the sweep time interval is smaller than the entire sweep time interval; and
    imaging, by the computer system, a second location of the geological formation using a correlation of only a second portion of the sweep with the seismic data, wherein the second portion of the sweep corresponds to a second portion of the sweep time interval, and wherein the second portion of the sweep time interval is larger than the first portion of the sweep time interval.

2. The method of claim 1, wherein the second portion of the sweep time interval corresponds to the entire sweep time interval.

3. The method of claim 1, wherein imaging the first location generates first imaging data with a first spatial resolution and a first signal-to-noise ratio; and wherein imaging the second location generates second imaging data with a second spatial resolution that is lower than the first spatial resolution and a second signal-to-noise ratio that is greater than the first signal-to-noise ratio.

4. The method of claim 1, wherein the sweep comprises a linear sweep from a first frequency to a second frequency.

5. The method of claim 1, wherein the sweep comprises a random sweep that includes a pseudo-random distribution of frequency components within a given frequency range.

6. The method of claim 1, wherein the first location corresponds to a first depth, and the second location corresponds to a second depth greater than the first depth.

7. A non-transitory, computer-readable medium having instructions stored thereon that are executable by a computer system to perform operations comprising:
    accessing, by the computer system, seismic data for a geological formation, wherein the seismic data was recorded, using one or more sensors, during a seismic survey in which one or more vibratory sources were used to perform a first sweep having a duration that defines an entire sweep time interval;
    imaging, by the computer system, a first location of the geological formation using a correlation of only a first portion of the first sweep with the seismic data, wherein the first portion of the first sweep corresponds to a first portion of the sweep time interval, and wherein the first portion of the sweep time interval is smaller than the entire sweep time interval; and
    imaging, by the computer system, a second location of the geological formation using a correlation of only a second portion of the first sweep with the seismic data, wherein the second portion of the first sweep corresponds to a second portion of the sweep time interval, and wherein the second portion of the sweep time interval is larger than the first portion of the sweep time interval.

8. The non-transitory, computer-readable medium of claim 7, wherein imaging the first location generates first imaging data with a first spatial resolution and a first signal-to-noise ratio; and wherein imaging the second location generates second imaging data with a second spatial resolution that is lower than the first spatial resolution and a second signal-to-noise ratio that is greater than the first signal-to-noise ratio.

9. The non-transitory, computer-readable medium of claim 7, wherein the first sweep comprises a linear sweep from a first frequency to a second frequency.

10. The non-transitory, computer-readable medium of claim 7, wherein the first portion of the first sweep includes fewer frequency components than were included in the entirety of the first sweep.

11. The non-transitory, computer-readable medium of claim 7, wherein the first location corresponds to a first offset distance between a first of the one or more vibratory sources and a first of the one or more sensors used to record the seismic data; and
    wherein the second, deeper location corresponds to a second offset distance between the first of the one or more vibratory sources and a second of the one or more sensors used to record the seismic data.

12. The non-transitory, computer-readable medium of claim 7, wherein, during the seismic survey, the one or more vibratory sources were used to perform a second sweep upon completion of the first sweep; and wherein the operations further comprise imaging, by the computer system, a third location of the geological formation using a correlation of a combination of the first sweep and the second sweep with the seismic data.

13. The non-transitory, computer-readable medium of claim 7, further comprising:
   imaging, by the computer system, a third location of the geological formation using a correlation of only a third portion of the first sweep with the seismic data, wherein the third portion of the first sweep corresponds to a third portion of the sweep time interval and the third portion of the sweep time interval is larger than the second portion of the sweep time interval; and
   wherein the first, second and third locations correspond to first, second and third increasingly larger depths.

14. A method of manufacturing a geophysical data product, the method comprising:
   towing a plurality of streamers that each include a plurality of seismic sensors;
   towing one or more vibratory sources;
   performing, using one or more of the vibratory sources, a first sweep having a duration that defines an entire first time interval; and
   recording, during the first time interval using the plurality of seismic sensors, seismic data on a tangible, computer-readable medium, thereby creating the geophysical data product, wherein the seismic data is based on seismic signals generated by performing the first sweep; and
   wherein the seismic data is recorded in a manner that allows processing to:
   image a first location of a geological formation based on a correlation of only a first portion of the first sweep with the seismic data, wherein the first portion of the first sweep corresponds to first portion of the first time interval, and wherein the first portion of the first time interval is less than the entire first time interval; and
   image a second location of the geological formation based on a correlation of an entirety of the first sweep with the seismic data;
   wherein the second location is at a greater depth than the first location.

15. The method of claim 14, wherein performing the first sweep comprises:
   driving a first vibratory source to generate the seismic signals, and wherein the seismic signals begin at a first frequency and linearly change to a second frequency.

16. The method of claim 14, wherein performing the first sweep comprises:
   driving a first vibratory source to generate the seismic signals, and wherein the seismic signals include a pseudo-random distribution of frequency components within a given frequency range.

17. The method of claim 14, wherein the one or more vibratory sources includes a low-frequency vibratory source and a high-frequency vibratory source, and wherein performing the first sweep comprises:
   driving the low-frequency vibratory source for the first portion of the first time interval; and
   driving the high-frequency vibratory source for a second portion of the first time interval.

18. The method of claim 17, wherein the first portion of the first time interval is of equal length to the second portion of the first time interval.

19. The method of claim 17, wherein the first portion of the first time interval is longer than the second portion of the first time interval.

20. The method of claim 14, further comprising:
   performing, using one or more of the vibratory sources, a second sweep for a second time interval, wherein the performing the second sweep includes beginning the second sweep as soon as the first sweep is completed; and
   recording, during the second time interval using the plurality of seismic sensors, the seismic data on the tangible, computer-readable medium.

21. The method of claim 14, wherein the recording includes continuously recording the seismic data on the tangible, computer-readable medium during the first time interval.

22. The method of claim 14, wherein performing the first sweep comprises:
   performing, during the first time interval, a plurality of linear sweeps from a first frequency to a second frequency.

* * * * *